(12) United States Patent  (10) Patent No.: US 9,076,349 B2
Gupta  (45) Date of Patent: Jul. 7, 2015

(54) GEOSOCIAL NETWORK SYSTEM AND METHOD FOR AGGREGATING GROUP MEMBERS

(76) Inventor: Raghav Gupta, Cupertino, CA (US)

( * ) Notice: Subject to any disclaimer, the term of this patent is extended or adjusted under 35 U.S.C. 154(b) by 967 days.

(21) Appl. No.: 13/094,819

(22) Filed: Apr. 26, 2011

(65) Prior Publication Data

US 2011/0260860 A1  Oct. 27, 2011

Related U.S. Application Data

(60) Provisional application No. 61/327,731, filed on Apr. 26, 2010, provisional application No. 61/327,732, filed on Apr. 26, 2010, provisional application No. 61/327,736, filed on Apr. 26, 2010, provisional application No. 61/327,734, filed on Apr. 26, 2010.

(51) Int. Cl.
  *G08B 1/08* (2006.01)
  *G09B 29/10* (2006.01)
  *G06Q 30/02* (2012.01)

(52) U.S. Cl.
  CPC .............. *G09B 29/106* (2013.01); *G06Q 30/02* (2013.01); *G06Q 30/0241* (2013.01); *G06Q 30/0251* (2013.01); *G06Q 30/0261* (2013.01)

(58) Field of Classification Search
  None
  See application file for complete search history.

(56) References Cited

U.S. PATENT DOCUMENTS

| | | | |
|---|---|---|---|
| 8,138,930 B1* | 3/2012 | Heath | 340/601 |
| 2008/0133336 A1* | 6/2008 | Altman et al. | 705/10 |
| 2008/0140650 A1* | 6/2008 | Stackpole | 707/5 |
| 2008/0248815 A1* | 10/2008 | Busch | 455/456.5 |
| 2008/0250025 A1* | 10/2008 | Abhyanker | 707/10 |
| 2009/0037101 A1* | 2/2009 | Koike et al. | 701/209 |
| 2009/0094602 A1* | 4/2009 | Ziskind et al. | 717/178 |
| 2009/0271244 A1* | 10/2009 | Kalasapur et al. | 705/10 |
| 2010/0205032 A1* | 8/2010 | Nielsen et al. | 705/9 |
| 2010/0228577 A1* | 9/2010 | Cunningham et al. | 705/5 |
| 2010/0285818 A1* | 11/2010 | Crawford | 455/456.3 |
| 2010/0332315 A1* | 12/2010 | Kamar et al. | 705/14.46 |

* cited by examiner

*Primary Examiner* — Kerri McNally
*Assistant Examiner* — Renee Dorsey
(74) *Attorney, Agent, or Firm* — Nwamu, P.C.

(57) ABSTRACT

A geosocial network system and method for aggregating group members. A plurality of geosocial groups is generated for each user, if desired. Each geosocial group might be based on particular topics of interests specified by the user. Each geosocial group can receive map data contributions from members depending upon the permissions granted by the creator of such a geosocial group.

16 Claims, 22 Drawing Sheets

GEOSOCIAL NETWORK SYSTEM AND METHOD FOR AGGREGATING GROUP MEMBERS

CLAIM OF PRIORITY

This application claims priority from Provisional Patent Application Ser. No. 61/327,731 entitled "AUTOMATIC ASSOCIATION OF GEO-SPATIAL COORDINATES TO A GROUP POSTING IN A SOCIAL COMMUNITY BASED ON A PRESENT LOCATION OF A POSTING DEVICE" filed Apr. 26, 2010, PPA Ser. No. 61/327,732 entitled GENERATION OF AN ADVERTISEMENT IN A GEO-SPATIAL MAP TARGETED TO GEO-SPATIALLY PROXIMATE MEMBERS OF A GROUP, filed Apr. 26, 2010, PPA Ser. No. 61/327,736 entitled MEMBER-CONTRIBUTED GEO-SPATIAL DATA MARKET PLACE FOR GROUP CONTENT OWNERS IN A SOCIAL COMMUNITY filed Apr. 26, 2010 and PPA Ser. No. 61/327,734 entitled AUTOMATIC MOBILE APPLICATION CREATION BASED ON AN EXISTING GROUP OF A SOCIAL COMMUNITY THAT ENABLES SECURE COMMUNICATION AND INTERACTION BETWEEN MEMBERS OF THE EXISTING GROUP DIRECTLY THROUGH THE MOBILE APPLICATION filed Apr. 26, 2010 all of the specification of which are hereby incorporated by reference as if fully set forth herein.

BACKGROUND OF THE INVENTION

The present invention relates generally to social networking systems and methods and more specifically to geosocial networking systems and methods for aggregating group members.

User and subscriber interest in the social media space continues to spiral. The leading social networking services, for example, have amassed hundreds of millions of subscribers within a relatively short duration.

Many social networking services are typically web-based. Such social networking services allow subscribers to create user profiles and subscriber accounts. Such user profiles might then be utilized to match subscribers with similar interests.

Subscribers themselves can invite their so called "friends" to join their social network. By virtue of being friends, some users share common interests with certain other users while some friends have no common interests.

There is a need to address one or more of the foregoing disadvantages of conventional systems and methods, and the present invention meets this need.

BRIEF SUMMARY OF THE INVENTION

Various aspects of a geosocial network system and method for aggregating group members can be found in exemplary embodiments of the present invention.

In an embodiment, a method for geosocial networking is disclosed. The method can aggregate multiple users around locations related topic of interests that are common to all users. As an example, users can be aggregated around fishing locations available within a geographical region.

Here, a plurality of geosocial groups based on the user's interest can be generated for each user, if each user so desires. Once created by a user, each geosocial group can receive map data from other member depending upon the permissions granted by the group creator. Member posts (geoposts) to each geosocial group are also viewable as data points on a map.

In this manner, and unlike the prior art, users need not be constrained by topics gleaned from user profiles. Neither are invitations to join specific interest groups required. Users and their interests are perfectly matched, since each user is provided with the capability of creating a group. If so inclined, a user can join one or more of the numerous preexisting geosocial groups.

In an alternate embodiment, users can track each other, send alerts (geoalerts) and receive advertisement as datapoints on the map. A further advantage of the present invention is that in one embodiment, user locations are automatically detected as data points on the map.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 1:
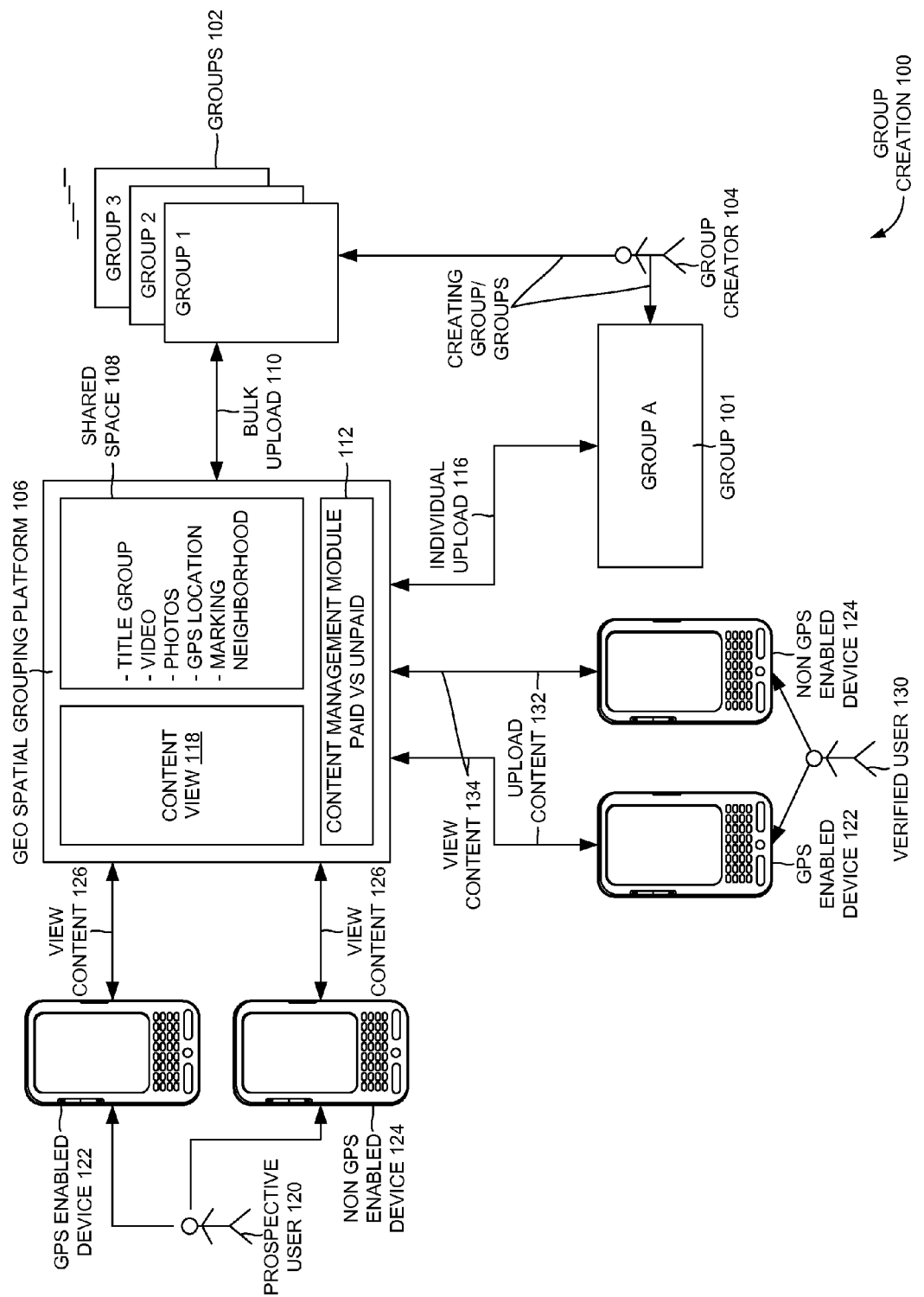
FIG. 1 illustrates geospatial grouping of one or more users of one or more electronic devices, according to one or more embodiment.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

A geosocial network system and method for aggregating group members. In one embodiment, users download a grouping application into one or more electronic devices to access a geospatial grouping platform on a server to create one or more groups. The electronic devices include, but are not limited to, electronic communication devices, laptops, desktops, personal digital assistants, portable computing devices and the like.

The grouping application may enable the users to create the groups in a geospatial grouping platform on a server based on contextual information associated with a geospatial environment. The contextual information includes, but is not limited to a geographical location of the user, user data, address data of the user, business data of the user, weather data, road traffic condition, map data, and the like. The users creating the group referred to hereafter as the group creators control and manage the created groups.

In one or more embodiments, one or more users are allowed to join one or more of the created groups as members of the groups. A membership may be granted to a user on satisfying a membership criteria provided by the group creators and/or the geo spatial grouping platform. The membership criteria may be based on the data associated with the user and/or the contextual information associated with the groups.

In one or more embodiments, if the data associated with the user matches the contextual information associated with the groups the user may be allowed to get the membership with the group. Consider for example, a user residing at New York may be accepted as a member in a "Residents of New York" group as the contextual information of the group matches the location data of the user.

In one or more embodiments, the membership criteria may not be based on the contextual information associated with the group, but may include a predefined set of rules based on which the membership with a group may either be granted or rejected for the users.

In one or more embodiments, the group creators and/or the geospatial grouping platform verify the users requesting for a membership with the groups. The verification is based on any data associated with the users, data provided by the users in response to a query proposed by the geospatial grouping platform based on contextual information, geographical location of the user, and the like.

Based on the verification the group creators either accept the request to provide membership to the users or reject the request. The geospatial grouping platform includes a database including one or more created groups.

The group creator may create the groups based on one or more contextual information, for example, a particular location. The group creator may include one or more group attributes with the groups created by the group creator.

The group attributes include one or more parameters defining a basis of the group, for example title of the group indicative of the contextual information, videos indicative of the contextual information, photos indicative of the contextual information, a particular geographic location, one or more neighborhood markings, for example, one or more landmarks within a region, and the like.

Each of the groups may include one or more group attributes. For example, a group called "Fishing spots in and around California" may include photos of one or more fishing spots in California and the members of the group may include inhabitants of California interested in fishing.

Each group may include a list of members of the group and a list of geo posts. Each of the members joining a group is allowed to add one or more geo posts to the groups. The geo posts include information associated with members of the created group, for example location information of the members and/or names of the members.

The geo posts may include textual data, audible data, visible data, and the like. In one or more embodiments, each geo post may be associated with multiple groups. In one or more embodiments the location information may be tagged with respective names of the members to constitute the geo posts.

The groups may be for example public groups, private groups, recreational groups, enterprise groups, and the like. The list of members may include location information of the members and/or name of the members.

In one or more embodiments, the name of the members may be tagged with their location information. In other embodiments, each group has a shared space within the geo spatial grouping platform. The shared space may be used to display one or more group attributes and/or one or more geo posts of the groups. For example a shared space of a group called "fishing spots in California" may have pictures and videos related to fishing spots in that geographic region and may also display one or more members of the group.

In one or more embodiments, each of the users is allowed to gain memberships with multiple created groups. In other embodiments, on accessing the geospatial grouping platform one or more user may receive an invitation to join one or more groups on the geospatial grouping platform based on the geospatial information associated with the user. The user may accept the invitation to join the group.

In one or more embodiments, the geospatial grouping platform automatically monitors and tracks geospatial information associated with the user and correlates the monitored geospatial information with the group attributes. Based on the correlation, the geospatial grouping platform may group the user into one or more new groups, may update a profile of the user tagged with one or more groups during accepting membership of the users with the groups, and performs one or more tasks based on one or more default settings of the groups.

The group creator may be able to set and control geographic boundaries for the groups and the members within the geographic boundaries may be able to access and/or view the groups based on the settings made by the group creator. The setting may include permission criteria to control access to the shared space of a group by one or more users. The permission criteria set by the group creator may grant the user a right to view and/or add geo posts within the group.

The permission criteria may provide full access or conditional access to the shared space of a group. The full access may allow the users to view and/or access the entire shared space of one or more groups. The conditional access may allow the users to view and/or access specific sections of the shared space of the groups with which they may or may not hold a membership.

For example, a prospective user may be allowed to view only the title of the group but not allowed to view list of members within the group, a verified member of the group may be allowed to view entire shared space of the group including the list of other members within the group, and the like. The permission criteria may also restrict addition of geo posts by one or more users of the group.

In one or more embodiments group attributes of the groups and/or information associated with members of the groups may be published in the shared space and/or the grouping application installed in the electronic devices of the users. In one or more embodiments, the information associated with the members of a group may be used to automatically develop one or more client side applications executable in an electronic device of a user.

The developed client side applications may be auto configured, pre configured, and/or post configured. In one or more embodiments, the client side application may be submitted to governing authorities for evaluation and/or to be incorporated within a general application store of an application provider, for example, in iTunes®, in iPhones®, and the like.

In one or more embodiments information associated with the members of the group may be marketed on one or more commercial and/or non commercial platforms and or submitted to governing authorities for evaluation and/or to be incorporated within a general application store of an application provider, for example, in iTunes®, in iPhones®, and the like.

In one or more embodiments, the marketing may be a peer to peer marketing. In one or more embodiments, the information associated with a group may be extracted and marketed on the commercial and/or non commercial platforms.

In one or more embodiments, information associated with a group and/or members of a group that may be proprietary for the group creator may be marketed to other group creators who may choose to incorporate the information into other groups in the shared space. In one or more embodiments information provided by the members of the groups may be used to update the respective groups of the members.

Each of the groups may contain one or more custom attributes. The members of the groups may either choose one or more group attributes from the custom attributes or may create and input data associated with the group attributes. In one or more embodiments, the member may add new geo posts to a group.

When the member adds a new geo post to the group, a default title may get filled as the title of the new geo post. The user may then choose to override the default title with any other desired title for the new geo post. For example, consider a "pothole reports" group. The group creator may specify "Big Pothole Here" as a default geo post title.

Whenever a user of the group encounters a pothole in the road, he may open up the grouping application, access the "pothole reports" group, and click "Create New Geo Post". The resulting form may have the current location of the user already prefilled from the device GPS if available and the title of the geo post may be pre-filled with "Big Pothole Here".

The new geo post may then be visible on the shared space of the group "pothole reports". In one or more embodiments, the application as described herein enables the owning user to create a mobile application based on an existing group of a social community. In one or more embodiments, the mobile application enables secure communication and interaction between members of the existing group directly without violating rules, privacy mechanisms and/or protocols of the overlying social network.

In one or more embodiments, the information associated with the members of the groups in the geo spatial grouping platform may be used to target one or more commercial products including for example advertisements by way of contextual targeting.

The membership/memberships associated with each of the members may be known to determine suitability of particular advertisements for the members. Based on the determined suitability the advertisements may be targeted to one or more of the members or one or more of the groups based on group attributes.

For example, a fishing product advertisement may be displayed on a map visible to members of a fishing-spots group. In one or more embodiments, the advertisements to be targeted to the members may be dynamically determined as and when the members join new groups, one or more members change one or more group attributes and/or information associated with members in the groups. For example, if a member enters a new geographical location, one or more advertisements suitable for inhabitants of the new geographical location may be targeted to the member.

In one or more embodiments, the targeting may be based on a location movement history of the member, for example, a member who is known to be frequently present in both San Jose and San Francisco may be presented with an advertisement for discount train tickets for commuting between San Jose and San Francisco.

The targeted advertisements may be displayed on the shared space and/or only to individual users. The visibility of the displayed advertisements may be priced for one or more users of the geo spatial grouping platform based on a zoom level, for example or for an advertisement to be visible when the user is zoomed out to see entire world, may have a higher pricing than for an advertisement to be visible only when the user has zoomed in to a local neighborhood.

In one or more embodiments an advertiser may be allowed to select a particular zoom level in which the targeted advertisement may be displayed in the shared space. In one or more embodiments, the visibility of the advertisements either in the shared space or to the individual users may be priced to the advertiser. In another embodiment, the targeting may also be based on geo-groups memberships, and current/past location.

FIG. 1 illustrates group creation 100 for one or more users of one or more electronic devices in a geospatial environment, in accordance with one or more embodiments.

The users may include, for example, a group creator 104, a prospective user 120, and/or a verified user 130. The verified user may be a member of the created group. The electronic devices may include, for example, a global positioning system (GPS) enabled device 122 and/or a non GPS enabled device 124.

In one or more embodiments, the group creator 104 may be allowed to create a group for example, group 101 and individually upload 116 the group 101 and/or one or more group attributes associated into a geospatial grouping platform 106 on a server. In some other embodiments, the group creator 104 may be allowed to create multiple groups 102, for example group 1, group 2, group 3 and upload the created groups via a bulk upload 110.

The group creator 104 may also upload multiple group attributes associated with the multiple groups 102 via the bulk upload 110. The group attributes include, for example, title of the group, videos, photos, GPS location and the like.

The group creator 104 may also mark neighborhood of the group, for example the group creator 104 may mark one or more landmarks on a map of a region included in a group dedicated to the region. The group attributes may be displayed in a shared space 108 in the geospatial grouping platform 106.

In one or more embodiments, the prospective user 120 is allowed to view 126 the content in the shared space 108 via a content view 118. The content in the shared space may include the groups, the group attributes, the geo posts within the groups, and the like. The accessibility of the content in the shared space 108 is controlled via the content management module 112 on the geospatial grouping platform.

In one or more embodiments, the accessibility may be a paid. In case of the paid accessibility, the prospective user 120 and/or the verified user 130 may be allowed to view 126 the content or a portion of the content within the shared space 108 associated with the created group via the content view 118 on paying a predetermined amount.

For example, the prospective user 120 may be allowed to view the title of the created group in the shared space for free but may be allowed to view the list of geo posts within the created group only on paying a specified amount. In some other embodiments, the accessibility may be an unpaid or free accessibility.

In case of unpaid accessibility, the prospective user 120 and/or the verified user 130 may be allowed to view 126 any amount of content in the shared space 108 via the content view 118 for free. The payment may be through a real and/or a virtual currency. Unpaid and/or paid accessibility can be restricted to specific sections of the shared space.

The verified user 130 may be allowed to view content 134 and or upload content 132 into one or more groups in the geospatial grouping platform 106. In one or more embodiments, the verified member may be allowed to upload data contextually associated with the created group into the shared space 108 of the created group. The data may be a text data, audio data, video data, and the like.

The data may include, for example, pictures of one or more landmarks in the neighborhood of a geographic location associated with the created group, name of one or more landmarks in the neighborhood of the geographic location associated with the created group, current location of the verified member, and the like.

In one or more embodiments, the group creator 104 may choose to be anonymous within one or more groups and/or to one or more specific users including prospective users and/or verified users, for example, the identity of the group creator may be visible to verified users 130 but may be hidden from prospective users 120. A user of the created group may choose to be anonymous while adding a geo post to the created group, so that the users viewing the geo post will not be able to determine the identity of author of the geo post.

Figure 2:
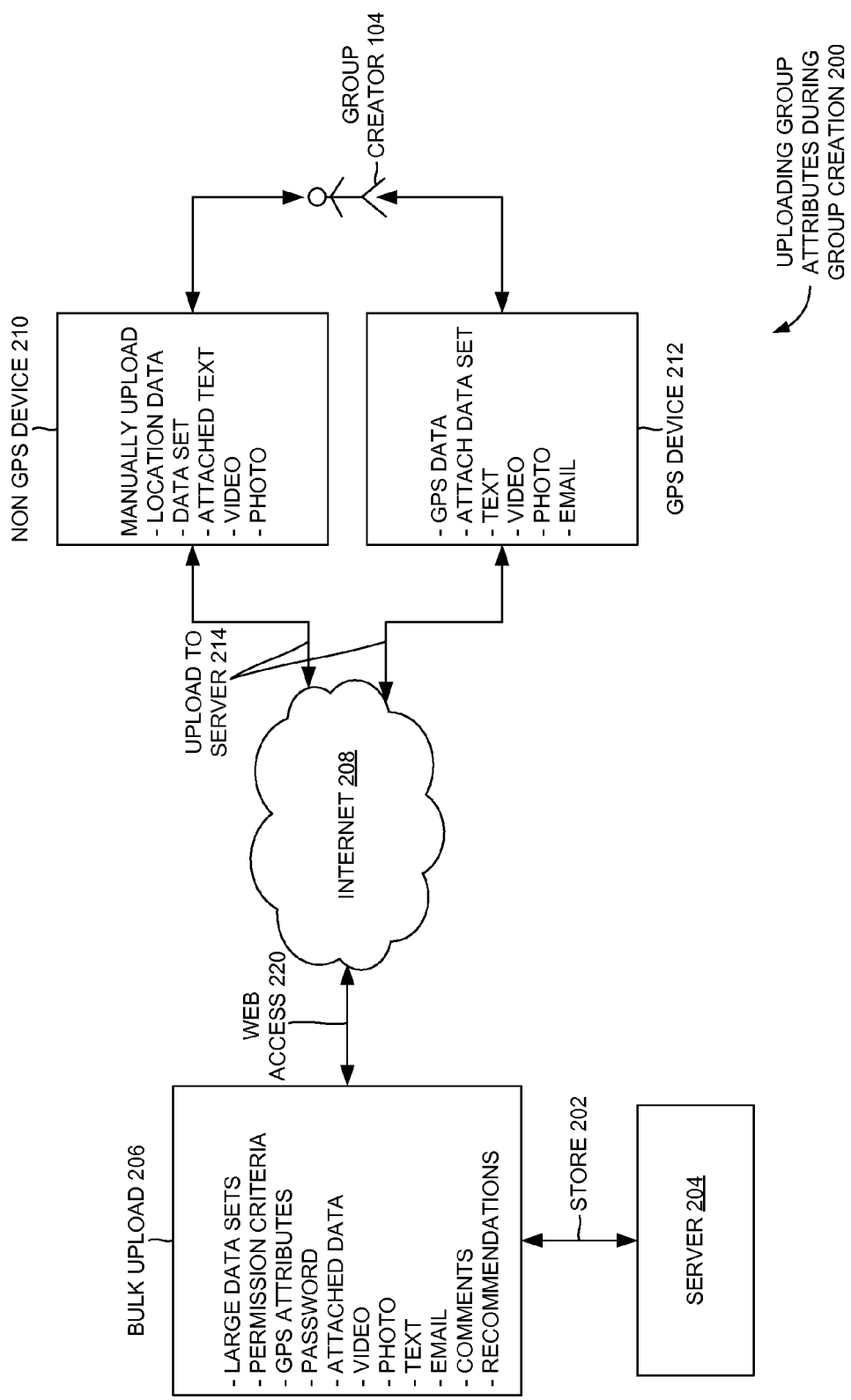
FIG. 2 illustrates uploading group attributes during a group creation, in accordance with one or more embodiments.

FIG. 2 illustrates uploading group attributes during a group creation 200, in accordance with one or more embodiments.

The group creator 104 uses a non GPS device 210 or a GPS device 212 to upload 214 one or more group attributes to one or more groups on the server 204, the groups being authored by the group creator. In case of the group creator 104 using the non GPS device 210, the group creator 104 manually uploads the group attributes including for example, a location data, a data set including a text, video, photo, an attached text including video and/or photo tagged to the text, and the like, to the server 204 through internet 208.

In case of the group creator 104 using the GPS device 212, the group creator 104 uploads 214 the group attributes including, for example, GPS data, an attached data set including text, video, photo, email and the like, to the server 204 via the internet 208.

In one or more embodiments, the uploaded group attributes are transferred to the server 204 via web access 220 and/or saved 202 on the server. In one or more embodiments, the group attributes are uploaded to the server 204 through a bulk upload 206. The bulk upload may contain, for example, large data sets, permission criteria. GPS attributes, password, attached data including text, video, photo, email, comments, recommendations and the like. The bulk upload may be stored 202 on the server 204.

Figure 3:
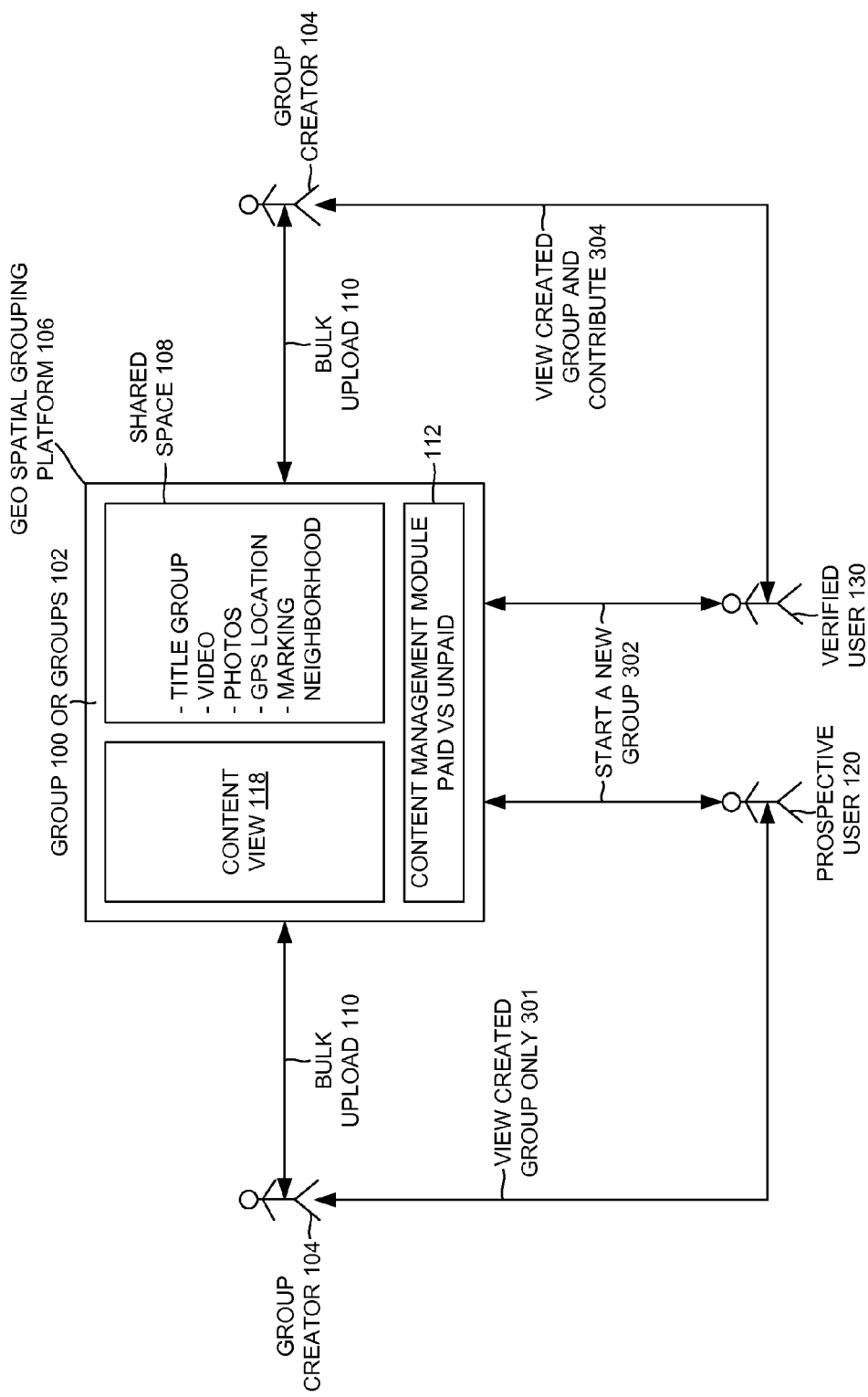
FIG. 3 illustrates geospatial grouping of one or more users of one or more electronic devices, in accordance with one or more embodiments.

FIG. 3 illustrates geospatial grouping of one or more users of one or more electronic devices, in accordance with one or more embodiments.

A group creator may create and upload a single group 100 or multiple groups 102 in a geospatial grouping platform. The group creator may upload multiple groups 102 via a bulk upload 110. A prospective user 120 may be allowed to view 301 the created group. The prospective user 120 may be given restricted accessibility to the created group and may not be allowed to contribute to the created group.

In the case of restricted accessibility, only specific group attributes of the created groups may be made visible to the prospective user 120. For example, only a title of the group may be rendered visible to the prospective user 120 while hiding information associated with various members of the created group or the geo posts within the created group.

In one or more embodiments, the prospective user 120 may view the group attributes and choose or not choose to join the created group based on the group attributes rendered to the prospective user 120. In one or more embodiments, the verified user 130 may be allowed to view the creator group and contribute 304.

The contribution may be in terms of adding contextual information associated with the verified user 130 to a profile of the verified user in one or more of the created groups. The contextual information includes, but is not limited to a geographical location, user data, address data, business data, weather data, road traffic condition, map data, and the like. The contribution may also be in terms of editing any of the added contextual information in the profile of the verified user.

Figure 4:
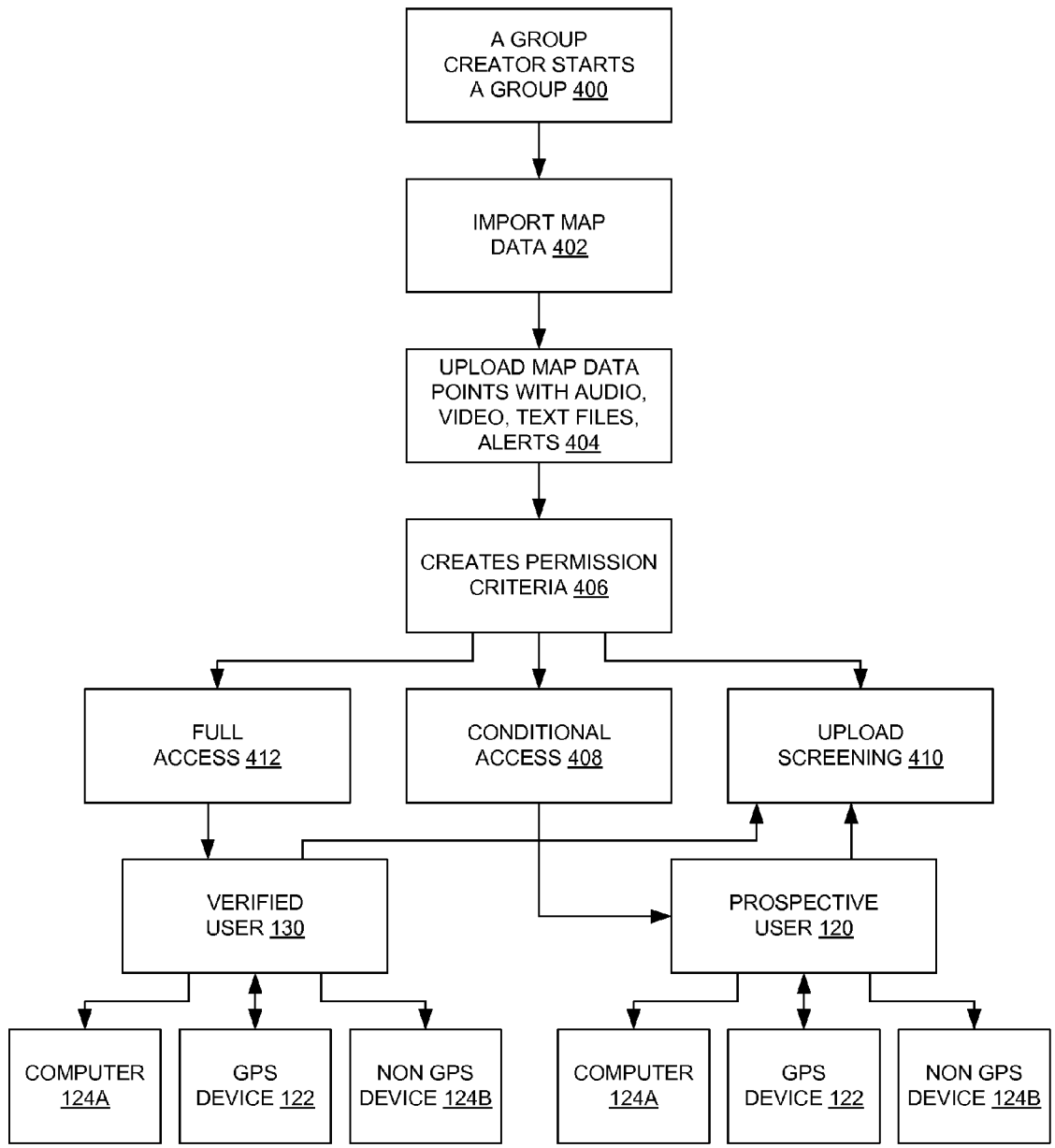
FIG. 4 is a flow chart illustrating setting of permission criteria for a created group by a group creator, in accordance with one or more embodiments.

FIG. 4 is a flow chart illustrating setting of permission criteria for a created group by a group creator, in accordance with one or more embodiments.

In one or more embodiments at step 400, the group creator starts a group at a geospatial grouping platform on a server accessed using a grouping application. The group creator starts the group based on contextual information, for example, a map data including a geographical map of a region.

At step 402, the group creator imports the map data into the created group to set the region as an attribute for the created group. At step 404, the group creator uploads one or more map data points within the map data to the geospatial grouping platform.

The map data points include, for example, one or more geographical locations, visual data associated with one or more geographical locations, audio data associated with one or more locations, and the like.

The map data points may be audio, video, text files, and alerts, in addition to the map data on the geospatial grouping platform. At step 406, the group creator creates permission criteria to control access to the created groups by one or more user of the geospatial grouping platform.

The users of the geospatial grouping platform include, for example, a verified user 130, and or a prospective user 120. The permission criteria may include one or more group attributes associated with the created groups. The permission criteria may be for example, a particular geographical location.

Based on the created permission criteria created by the group creator, the geospatial grouping platform provides full access or a conditional access to the created group. At step 412, the group creator provides full access to the verified user 130 to access the created group.

On providing full access, the verified user 130 is allowed to access all the group attributes associated with the created group. In one or more embodiments, the verified user 130 is allowed to modify one or more group attributes associated with the created group on gaining full access.

At step 408, the group creator provides conditional access to the prospective user 120. On gaining conditional access, the prospective user 120 is allowed to access one or more selected group attributes of the created group. For example, the prospective user 120 may be allowed to view a title of the created group but may not be allowed to access information associated with members of the created group.

At step 410, the prospective user 120 and the verified user 130 may upload screening. The verified user 130 and the prospective user 120 may access the created group in the geospatial grouping platform through a GPS device 122, a computer 124A and/or any other non GPS device 124B.

Figure 5:
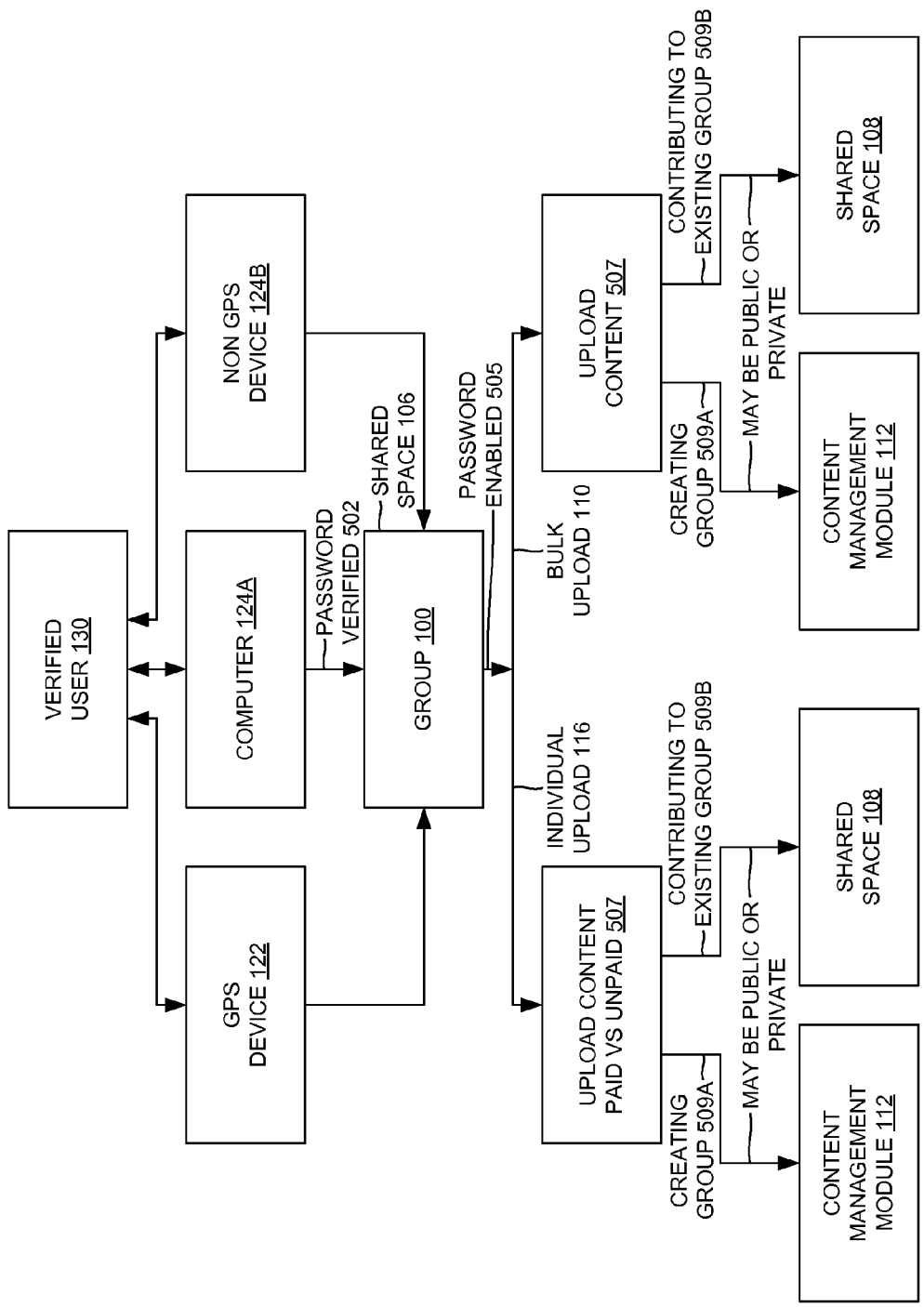
FIG. 5 is a flow chart illustrating accessing a group in a geospatial grouping platform by a verified user, in accordance with one or more embodiments.

FIG. 5 is a flow chart illustrating accessing a group in a geospatial grouping platform by a verified user, in accordance with one or more embodiments.

The verified user 130 may access the group 100 through a GPS device 122, a computer 124A and/or any other non GPS device 124B. In one or more embodiments, at step 502, a password is verified to allow the verified user 130 to access the group 100 rendered in a shared space within the geospatial grouping platform 106. In one or more embodiments, at step 505, the password is enabled.

After enabling the password, in one or more embodiments, at step 507, the verified user 130 is allowed to upload any content of contextual relevance with the group attributes of the group 100. The verified user 130 uploads the content via individual upload 116 or a bulk upload 110 into the group 100.

In one or more embodiments, the upload may be a paid upload or an unpaid upload. In one or more embodiments, at step 509A, the verified user 130 may create a group via a content management module 112 in the geospatial grouping platform.

At step 509B the verified user 130 may contribute to an existing group in a shared space 108 in the geospatial platform. The verified user 130 may render private or public accessibility to the created group.

Also, the verified user 130 may render private or public accessibility to the contribution to the existing group, for example, none of the members of an existing group may be able to view contributions of the verified user 130 in the existing group, if the verified user 130 renders private accessibility to the contribution.

Figure 6:
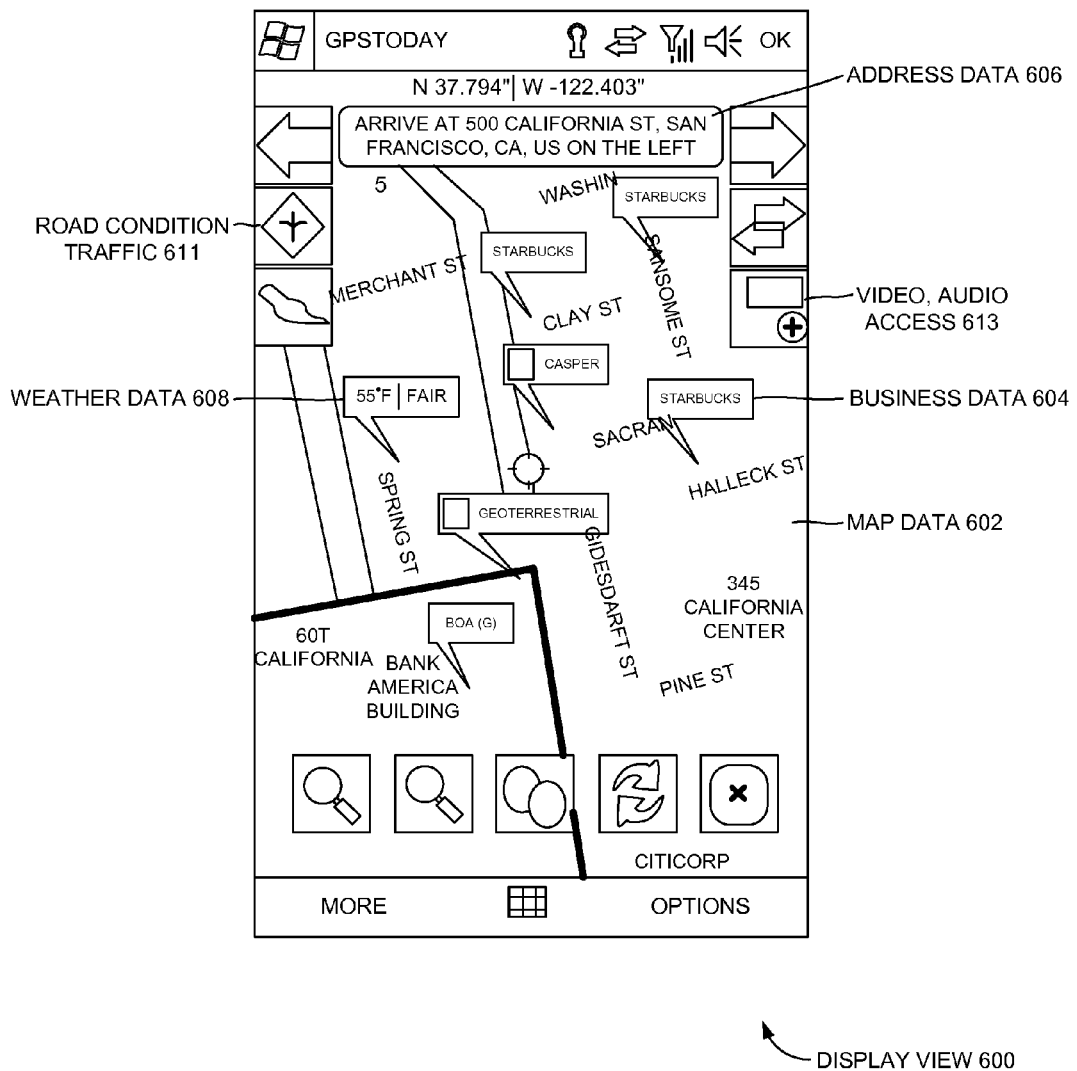
FIG. 6 is illustrates a display view associated with a group formed via geospatial grouping of one or more users of one or more electronic devices, in accordance with one or more embodiments.

FIG. 6 illustrates a display view 600 associated with a group formed via geospatial grouping of one or more users of one or more electronic devices, in accordance with one or more embodiments.

The display view 600 includes, for example, a map data 602. The map data 602 is, for example, a geographical map as illustrated in FIG. 6. The display view also includes a business data 604, for example, a location of a coffee shop called "Starbucks", an address data 606, for example "ARRIVE AT 500 CALIFORNIA ST, SAN FRANCISCO, CA, US ON THE LEFT", a weather data 608, for example "55 F, FAIR", a road traffic condition 611, a video and/or audio access 613, and the like. In one or more embodiments, the display view 600 includes one or more custom attributes associated with the group.

Figure 7:
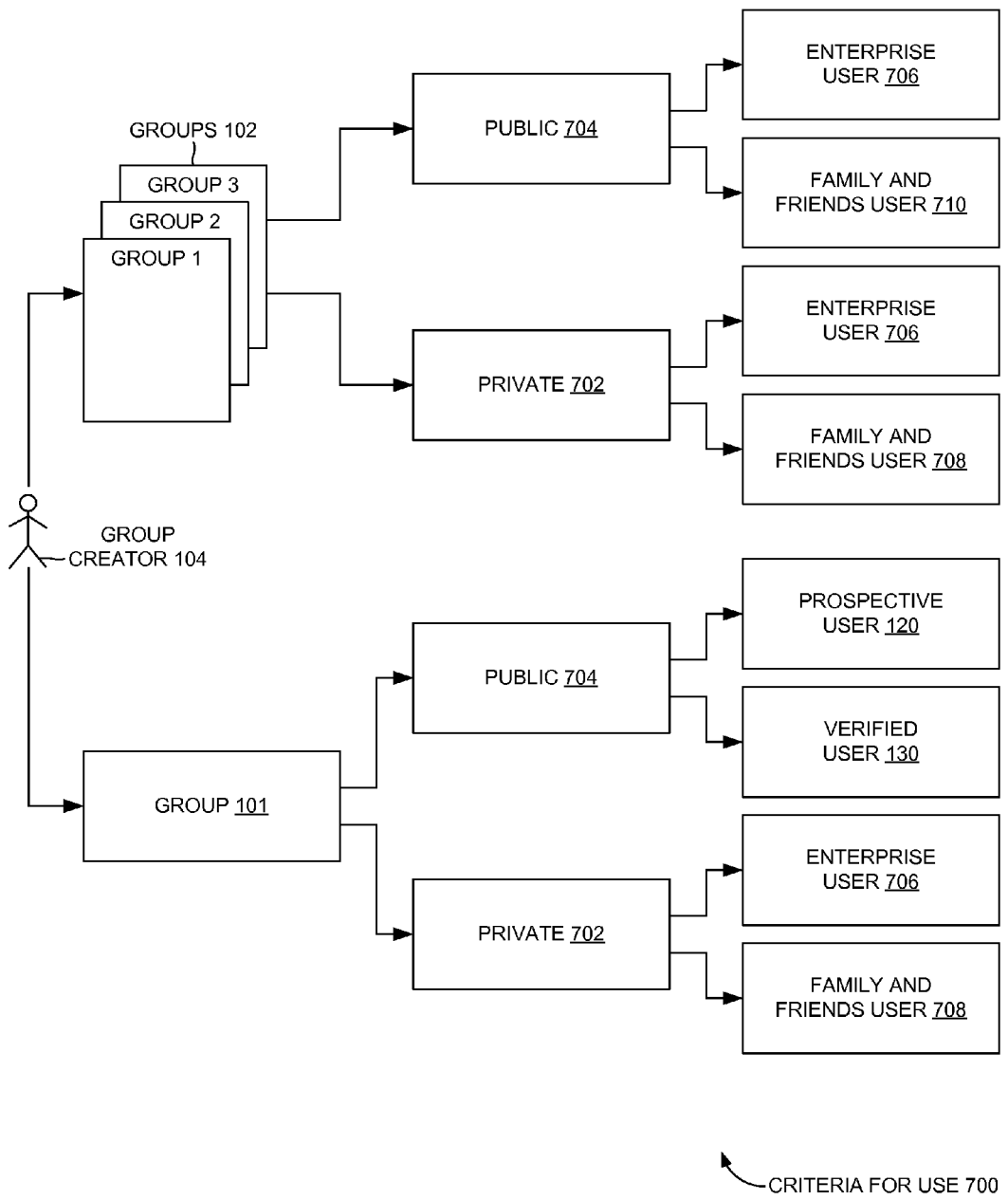
FIG. 7 illustrates criteria for use of geospatial grouping of one or more users, in accordance with one or more embodiments.

FIG. 7 illustrates criteria for use of geospatial grouping of one or more users, in accordance with one or more embodiments.

A group creator 104 can create a single group 101 or multiple groups 102. Each of the created group 101 or the created groups 102 may be classified as either a private 702 group or a public group 704 based on the accessibility parameters of the group 101 and/or groups 102 set by the group creator 104. Each of the private 702 group or the public 704 group may be accessible by a verified user 130 and/or the group creator 104.

The accessibility is however controlled by the accessibility parameters set by the group creator 104. The verified user 130 may include, for example, an enterprise user 706. For example, enterprise may include a representative of a company called "Ultra" creating a private group called "Employees of Ultra" to monitor and track one or more employees of the company constituting the enterprise users in this case and the representative of the company may be the group creator 104.

The verified user 130 may also include, for example, family and friend users 710. One or more prospective users may be allowed to access public 704 groups.

Figure 8:
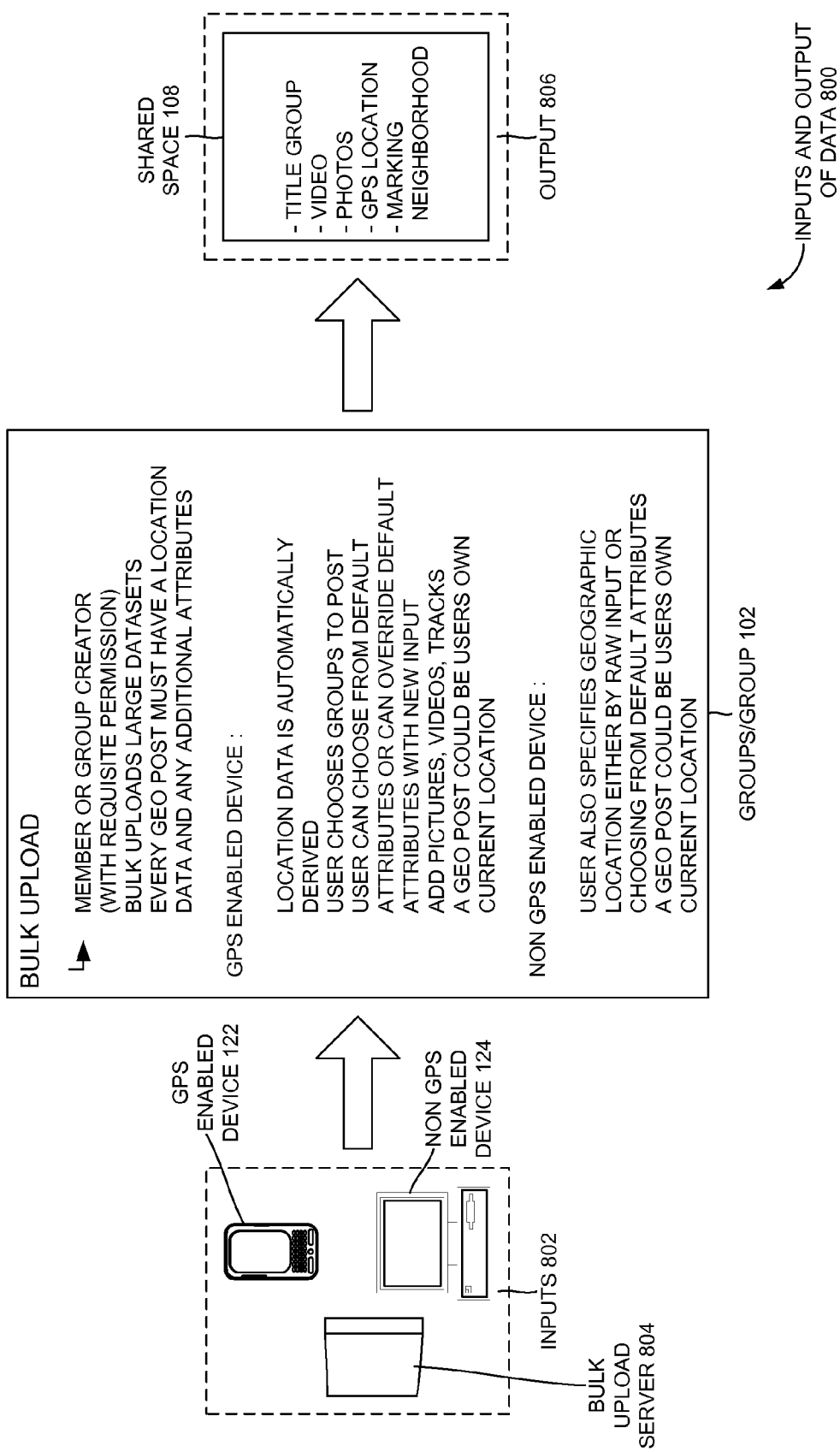
FIG. 8 is a diagrammatic process flow illustrating input and output of data within a geospatial grouping platform, in accordance with one or more embodiments.

FIG. 8 is a diagrammatic process flow illustrating input and output of data within a geospatial grouping platform, in accordance with one or more embodiments.

In one or more embodiments, one or more users of the geospatial grouping platform, including one or more members and one or more group creators are allowed to input data into one or more groups within the geospatial grouping platform. The input of the data into the groups is controlled by one or more requisite permissions derived out of one or more accessibility preferences set by one or more creators of the groups.

The accessibility preferences may allow the users to not input data, input data within specific sections of data associated with the group, input data into any section within the data associated with the group. The data associated with the groups may include one or more group attributes contextually associated with the geospatial environment of the users of the group and the creators of the group.

In one or more embodiments, the data may be input 802 via one or more of a bulk upload server 804, a GPS enabled device, and a non GPS enabled device 124. In one or more embodiments, the geospatial grouping platform may allow bulk upload of large datasets into the groups. Every data input 802 into the groups constitutes a geo post.

In the case of bulk upload, every geo post must have a location data and any additional group attributes. In case of input 802 of data through a GPS enabled device, location data of the user may be automatically derived from the GPS enabled device.

The user may be allowed to choose groups to post/input 802 the data into. The user may choose from one or more default attributes to input data, for example, a user may choose one or more options from a drop down menu. In one or more embodiments, the user may override default attributes with new data input 802 into the groups.

The data input 802 by the users may constitute geo posts within the groups. In one or more embodiments, the user may add pictures, videos, track a current location of the user as geo posts. In case of input 802 of data through a non GPS enabled device, the user specifies the current location of the user either as a raw/new input or by choosing from one or more default attributes. In one or more embodiments, the data input 802 into the groups is output 806 through a shared space 108 within the geospatial grouping platform.

Figure 9:
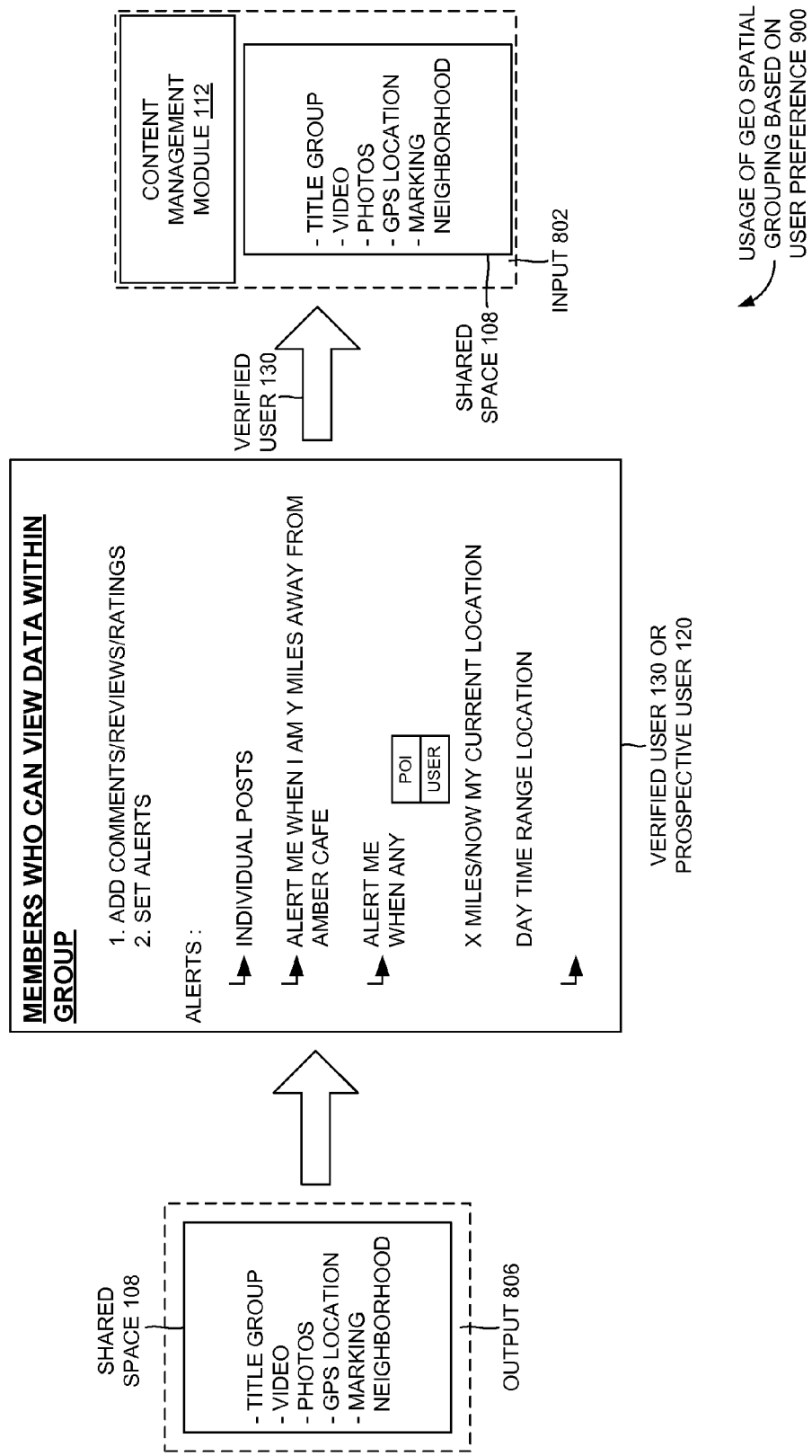
FIG. 9 is a flow chart illustrating a process of usage of a geospatial grouping based on user preference, in accordance with one or more embodiments.

FIG. 9 is a flow chart illustrating a process of usage of a geospatial grouping based on user preference, in accordance with one or more embodiments.

In one or more embodiments a group creator 104, or a user including a member, a verified user 130, and/or a prospective user 120 of a geospatial grouping platform may be allowed to provide one or more user preferences to one or more created groups in the geospatial grouping platform.

The users may be allowed to view data within the group. The user preferences may include, for example, criteria for automatic alerts by the geospatial grouping platform. For example, a user may indicate a criteria "ALERT ME WHEN I AM Y MILES AWAY FROM AMBER CAFE".

The geospatial grouping platform monitors a geographical location of the user from the location of "Amber Café" at any point of time and alerts the user whenever the user is within a distance of "Y" miles from location of the "Amber Café", saved in data associated with group attributes called "restaurant" created by the user.

In some embodiments, the criteria may include, for example "alert me when any point of interest in this group or another member of this group is more than, or less than, x miles from my current location" as illustrated in FIG. 9. The alerts include but are not limited to, alerts in the electronic device of the user, and/or execution of any arbitrary function in the electronic device of the user upon receiving the alert.

In one or more embodiments, the users are allowed to post data into a display associated with the group. The data may include, for example, comments, reviews, and or ideas contextually associated with one or more group attributes.

In one or more embodiments, the users may set alerts on individual posts, for one or more users of the group, and/or an entire group. In one or more embodiments, the user may input 802 the user preferences into the geospatial grouping platform via a content management module 112 in the geospatial grouping platform.

One or more outputs may be generated by the geospatial grouping platform based on the inputs 802 provided by the user. The output 806 may be rendered through a shared space 108 in the geospatial grouping platform.

Figure 10:
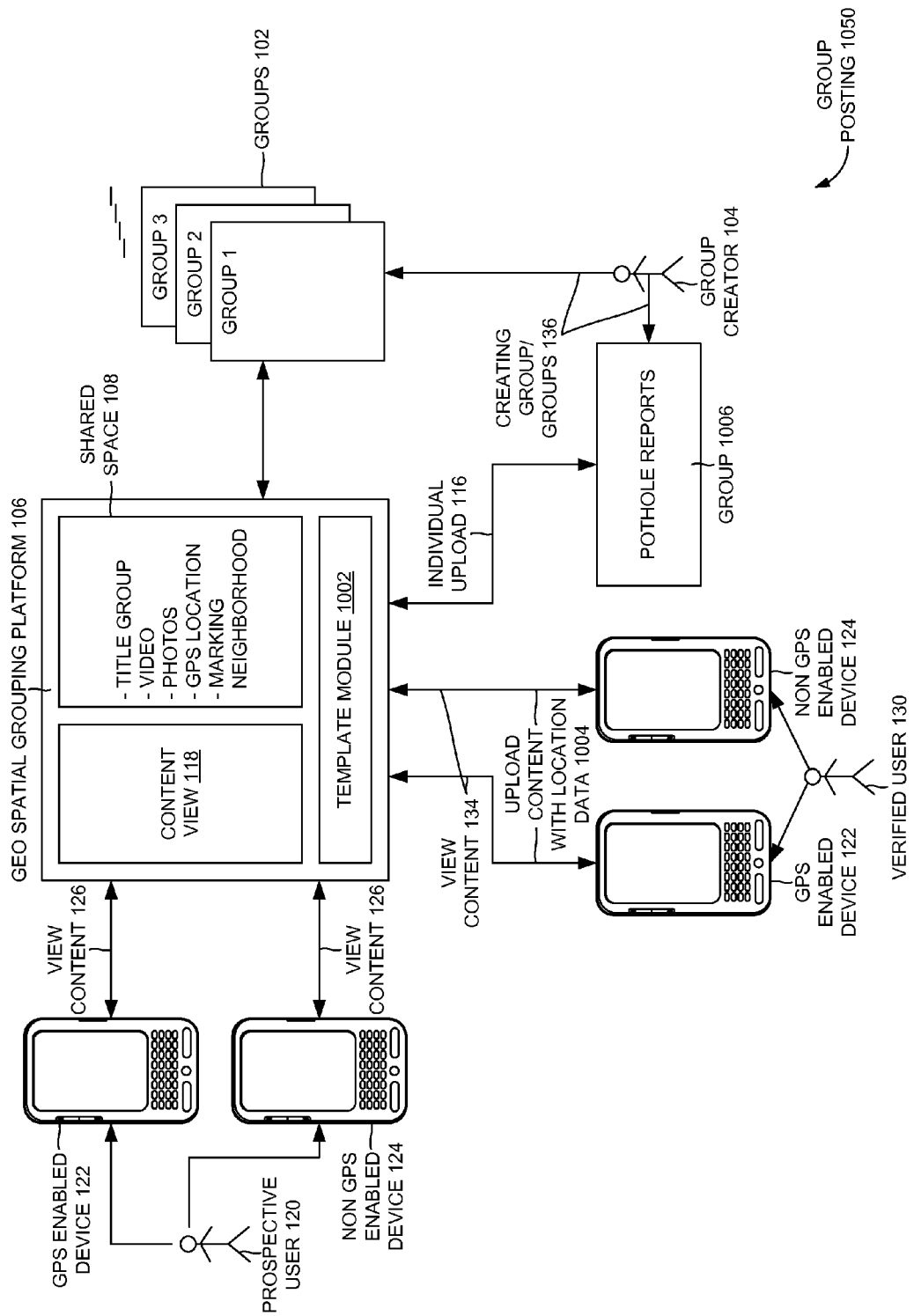
FIG. 10 illustrates automatic association of geo-spatial coordinates to a group posting in a social community based on a present location of a posting device, according to one or more embodiments.

FIG. 10 illustrates automatic association of geo-spatial coordinates to a group posting in a social community based on a present location of a posting device, according to one or more embodiments.

As aforementioned, the users may be enabled to create and join groups. In one or more embodiments, a group may have members and posts. In one or more embodiments, the group construct (e.g., framework) may provide the group owner with a mechanism to manage access of each member.

In one or more embodiments, the application may provide a template module 1002 for a group creator 104 (e.g., group owner, group administrator) of the group to configure settings for posting. In one or more embodiments, the application may obtain a name, and a geo-location attached to every post, with optionally as much additional metadata as desired.

In one or more embodiments, the group may serve as a one-way information dissemination mechanism where members (except the owner) can only view posts previously uploaded by owner. In alternate embodiments, all or some members may have permissions to add new posts to the group as desired.

In one or more embodiments, the user 130 may be a member of multiple such groups. For example, upon joining a "pothole reports" group 1006, whenever a user 130 encounters a pothole, the user 130 may initiate the application, and view the "pothole reports" posts on a map. In one or more embodiments, the mobile device GPS may be configured to automatically position the map at the user's current location.

In one or more embodiments, if the group already has a post for the encountered pothole, the user 130 may promote or highlight the existing post to re-emphasize/extend its visibility. If the post for the encountered pothole does not exist, the user 130 may be provided an option to create a post.

In one or more embodiments, the user 130 may simply press the "New Post" button in the potholes group, with a post title "Big pothole here" automatically pre-filled as default title, and the location of the pothole automatically pre-filled via device GPS (e.g., configured through the template module 1002).

The user's task may be reduced to submitting the post by using a submit button. In one or more embodiments, a single button press can be used to perform the complete task of creating and submitting a new post. In one or more embodiments, after submitting the post, all other members of the "pothole reports" group may be enabled to see the pothole on the map in their mobile application. In alternate embodiments, if the device is a non GPS device, then the user 130 may be provided with an option to provide information such as an approximate location (e.g., place or landmark) of the pothole and the post may be submitted.

In one or more embodiments, the application may reduce the user 130 task of data entry to generate post for the pothole information. The task of the user 130 may have been made easy by the owner while creating the "pothole reports" group.

In one or more embodiments, the owner may be provided with the template module 1002 to configure the "pothole report" group 1006 such that for creation of new post for the "pothole report" group 1006, the user 130 would be provided with a readymade template with pre-filled default title as "Big Pothole here" and location information. However, in one or more embodiments, the user 130 may also be enabled optionally to override the default settings for a new post when needed.

Figure 11:
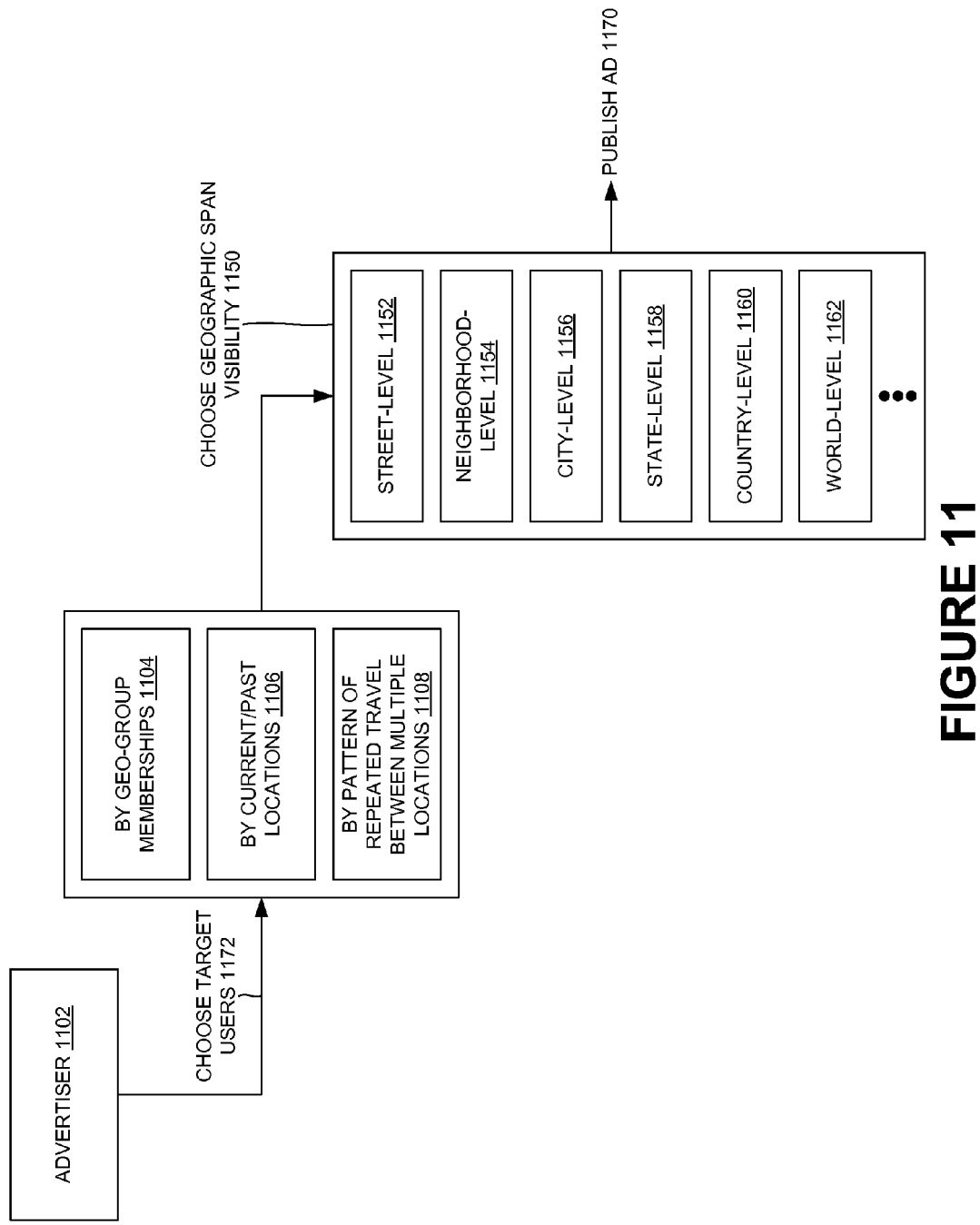
FIG. 11 illustrates generation of an advertisement in a geo-spatial map targeted to geo-spatially proximate members of a group, according to one or more embodiments.

FIG. 11 illustrates generation of an advertisement in a geo-spatial map targeted to geo-spatially proximate members of a group, according to one or more embodiments.

In one or more embodiments, the application as described herein may enable generation of advertisement in a geo-spatial map targeted to members of a group who are in proximity to a particular location. In one or more embodiments, an advertiser 1102 may be enabled/permitted to place an advertisement in a geo-spatial map.

In one or more embodiments, the advertiser 1102 may visit a geo-spatial website enabled by the application for advertising. In one or more embodiments, the advertiser 1102 may choose target users based on product/service to be advertised. In one or more embodiments, the target users 1172 may be found through one or more of geo-group memberships 1104, current/past locations 1106, and pattern of repeated travel between multiple locations 1108.

In one or more embodiments, the advertiser 1102 may find a large list of public groups. In one or more embodiments, the target users 1172 may be in one or more groups or may not be in any group.

In one or more embodiments, the list of public groups may provide the advertiser 1102 with almost entire user base neatly segmented by professed interest. In one or more embodiments, the advertiser may be enabled to choose one or more groups to advertise based on the product/service.

In one or more embodiments, most of the groups may be geographically restricted. However, some groups may not be geographically restricted. For example, certain groups based on popular interests like "fishing spots", or "lighthouses", or "speed traps", or "earthquake alerts", "dog parks", etc. may have users contributing information throughout the world. In one or more embodiments, some groups may use a geographic region or property as a common axis, like "NY residents", or "caltrain riders", or "NY subway riders" and so forth.

In one or more embodiments, the advertiser 1102 may be enabled to choose any of the groups of choice and provide advertisements suitably. In one example embodiment, the advertiser 1102 may be a caltrain authority.

In the example embodiment, the advertiser 1102 may choose a group "caltrain riders" suitable for advertising. In one example embodiment, caltrain riders group may have been created by a user who may be a passenger. The user would have created the group while using the application. The user would have wanted to socialize with other passengers during a journey and during the journey only.

In order to make the group useful to other passengers, the user would have upload locations of one or more stations, pictures and/or notes associated with the stations. In one or more embodiments, whenever a member uses the application and views the caltrain riders group, the member may be provided with a map centered on the member's current location and train stations as geo-posts.

In addition, the member may be provided with real-time geo-posts of other member who may be sharing their location in this group. If the member desires to share the location, the member may be enabled to share the location within the group, which may be visible to other members. In one or more embodiments, the "caltrain riders" may be one of a group where the target users for the caltrain authority can be found.

In the example embodiment, the caltrain authority may be enabled to advertise in the caltrain riders group. In one or more embodiments, the caltrain authority may be enabled to advertise directly or upon permission from a group owner into the group.

In the example embodiment, an advertisement for selling discounted yearly caltrain passes may be placed by the caltrain authority at map locations corresponding to the caltrain stations which may be made visible for the "caltrain riders" group. For example, the advertisement markers "10% off yearly caltrain pass for daily commuters" may be placed on the at map locations corresponding caltrain stations within the "caltrain riders" group.

In one or more embodiments, the advertiser 1102 may also target users to advertise their product/service based on current/past locations 1106. For example, the advertiser 1102 may be an owner of a coffee shop that is in proximity to the caltrain station. In the example embodiment, the advertiser 1102 may place an advertisement marker stating "caltrain ticket holders 20% off on coffee" above the shop. The advertisement posted by the advertiser 1102 may be visible to all the members whenever they pass by close to the caltrain station or they disembark or embark from that station.

In one or more embodiments, the advertiser 1102 may target users to advertise their product/service based on pattern of repeated travel between multiple locations 1108. In the example embodiment, an advertisement for selling discounted yearly caltrain passes for certain train routes may be placed by the caltrain authority at strategic points along the routes by placing at the advertisement markers "10% off yearly caltrain pass for regular commuters of the route". In one or more embodiments, the advertisement markers or advertisements may be viewed by users as geoposts in the map.

Similarly, in yet another example embodiment, the advertiser 1102 may be an owner of a retail establishment selling fishing lures or rods. The target users for the advertiser as in the example embodiment may be fishing enthusiasts.

Also, the target users for the advertiser may be found in one or more fishing groups such as for example "fishing spots" group. The advertiser may be enabled to post advertisements for selling fishing lures or rods on the map in proximity to a fishing hotspot where members of the group may be known to congregate or post pictures.

In one or more embodiments, the retail establishment may or may not be actually located at the location where advertisement is placed on the map. Rather, the advertisement may be used to serve as a mechanism of delivering contact information such as a phone number, an email or a website address of the retail establishment. In one or more embodiments, the advertisements may be geo-posts that enable impression and click-thru tracking.

In one or more embodiments, the users of the application may be enabled to customize a visibility of the geographic span 1150 in the device viewport (e.g., display interface). For example, the geographic view may be zoomed into a neighborhood level or the geographic view may be zoomed out to show the entire world.

In one or more embodiments, the application may be configured to present a threshold number of advertisements for a particular geographic span in the device viewport. However, in one or more embodiments, for a particular geographic span there may be more advertisements present than the threshold number of advertisements that can be displayed in the device viewport.

Therefore, the advertiser 1102 may be provided with an option to display advertisement based on preference of visibility 1150 in a geographic span. In one or more embodiments, the advertisements may be visible in one or more of but not limited to a street level 1152, a neighborhood level 1154, a city level 1156, a country level 1158, a world level 1160, etc.

The advertisements may be made visible to the user on varying depth of visibility (e.g., zooming in and zooming out). For example, a user may find a set of advertisements at a street level 1152, the advertisements may change when the user modifies the depth of visibility 1150 from the street level 1152 to a neighborhood level 1154. In one or more embodiments, the options to advertise in various levels may be offered to the advertiser 1102 with a varying pricing scheme by the application.

In one or more embodiments, advertisements visible only at the street level 1152 may be priced at a lower rate than advertisements desired to be visible even when user is viewing a map of the entire world. Based on the pricing, the advertiser 1102 may be enabled to post/publish 1170 the advertisement in the geo-spatial environment.

Also, in one or more embodiments, the advertisements may be presented to individual users based upon plurality of their location history movement, instead of mere current location or a single past location, regardless of group affiliation. For example, users known to be commuting frequently between to San Jose and San Francisco may be presented with ads for discount train tickets for commuting between San Jose and San Francisco. Users known to be frequently commuting between San Francisco and Los Angeles could be presented with discounted flight tickets between the two cities.

Furthermore, in one or more embodiments, a primary method of presenting an advertisement to a user may be as a marker on the map while using the application. In alternate embodiments, the advertisement may also be delivered via other means as well, including but not limited to email, Short Message Service (SMS), direct mail etc. For example, discount train tickets advertisements could be displayed to the user on the map, or the offer could be sent via the user's known contact information at a later point of time.

Figure 12:
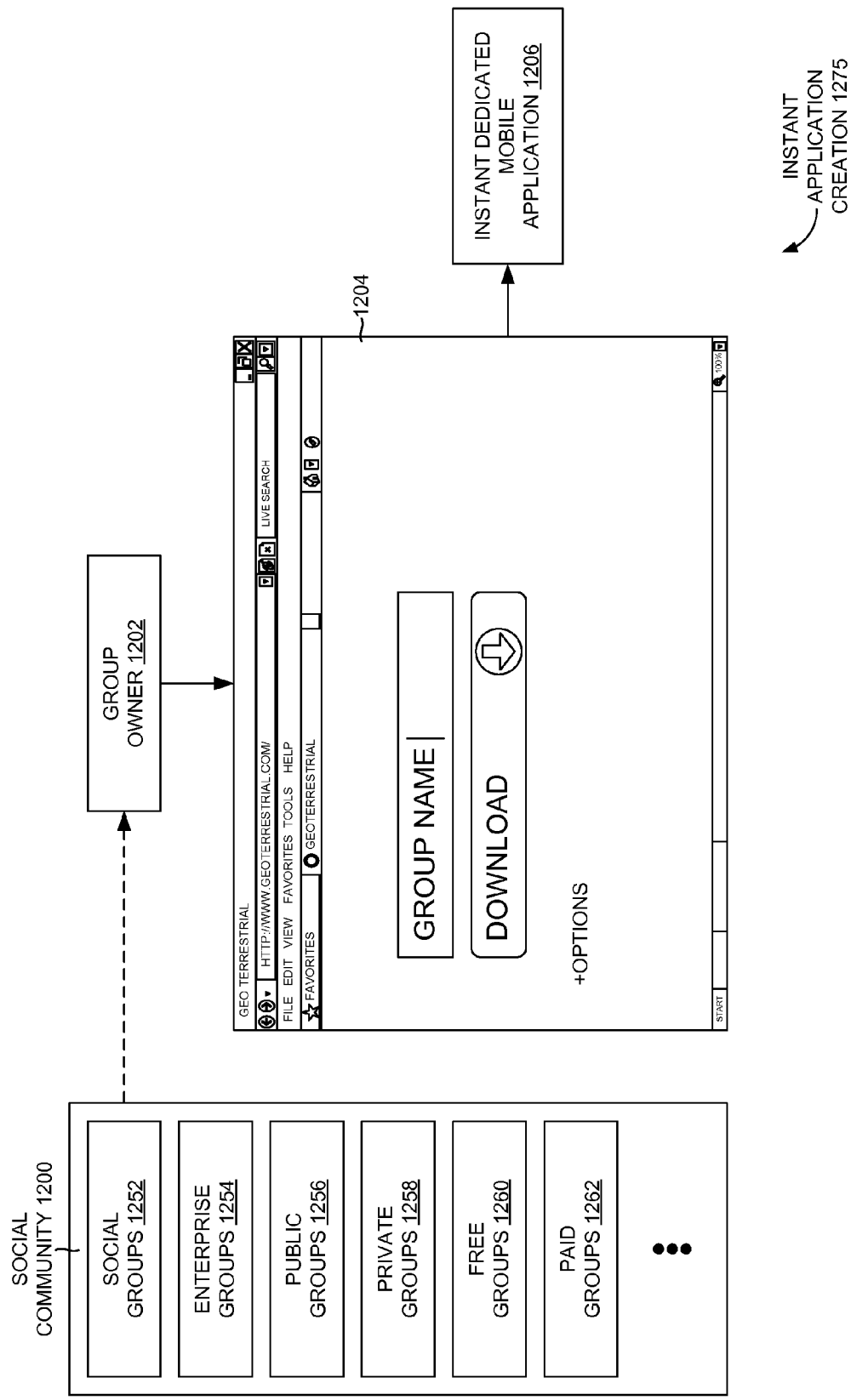
FIG. 12 illustrates an automatic mobile application creation based on an existing group of a social community that enables secure communication and interaction between members of the existing group directly through the mobile application, according to one or more embodiments.

FIG. 12 illustrates an automatic mobile application creation 1275 based on an existing group of a social community that enables secure communication and interaction between members of the existing group directly through the mobile application, according to one or more embodiments.

In one or more embodiments, in a social community 1200 created by one or more groups 102, the users may be members of one or more groups 102. In one or more embodiments, the application may enable the owning user to quickly create a separate, dedicated mobile application 1206 solely for use by members of that single group.

In one or more embodiments, since the communication and interaction methodology may be predefined and fixed by virtue of the design of the overall social community 1200, the application may enable the owner of the group 1202 to customize some basic visual parameters to allow immediate creation of a customized mobile application 1206 dedicated to the specific needs of the particular group.

For example, group owner 1202 might be an event organizer for an upcoming bi-cycling sports event. Group owner 1202 can create public group 1256, input information about checkpoints, relevant landmarks, and participants' real-time location.

Thereafter, group owner 1202 selects a submit button (not shown) to create and download instant dedicated mobile application 1206 for this event. Mobile application 1206 can then be marketed and made available to the event's fans and attendees as a means of following the event's progress in real-time.

As another example, group owner 1202 can create a private group 1258, enter information about its important locations, and select a submit button (not shown) to create and download instant dedicated mobile application 1206. This application can be used by its mobile employees to submit information from the field, and by the managing employees to track the location of its mobile employees.

Further yet, group owner 1202 might be a government organization that creates public group 1256, and thereafter enters information about important city landmarks and tourist locations, and then selects a submit button (not shown) to create and download instant dedicated mobile application 1206. This application can then be marketed and made available to all tourists visiting the city to navigate the city's important landmarks and tourist locations.

In each of above examples, group owner 1202 is presented with several customization options to alter the look and feel of the mobile application and can make available additional functionality that is specific to the needs of the corresponding group. In this manner, the present invention enables a powerful platform that allows creation of full-featured and customizable geo-social networking applications at the touch of a button.

As another example, assuming a user creates a group called "pothole reports", which enables members to access nearby potholes information reported recently (optionally displaying on a map), and also to contribute to the group whenever they encounter previously unreported potholes. Initially, the pothole reports group may be accessed as a part of the overall social community 1200.

But if the usage of the group increases, the owner may be enabled to instantly create a dedicated mobile application 1206 just for the pothole reports group, which may also enable new users to register for the social community and become a member of this group in one single step. In one or more embodiments, rules, privacy mechanisms and/or protocols of the overlying social network would not be violated and would be still respected, except for the fact that the domain of the new app may be totally limited to within the pothole reports group.

In other embodiments, a group could also be an enterprise group 1254, created by a corporation, for conducting business operations/tracking employees, etc. In the example embodiment, the application may enable immediate creation of a mobile application dedicated for the corporation employees use only, without any leakage whatsoever into the overlying social community. In one or more embodiments, other groups may be social groups 1252, public groups 1256, private groups 1258, free groups 1260 and paid groups 1262, for example.

Figure 13:
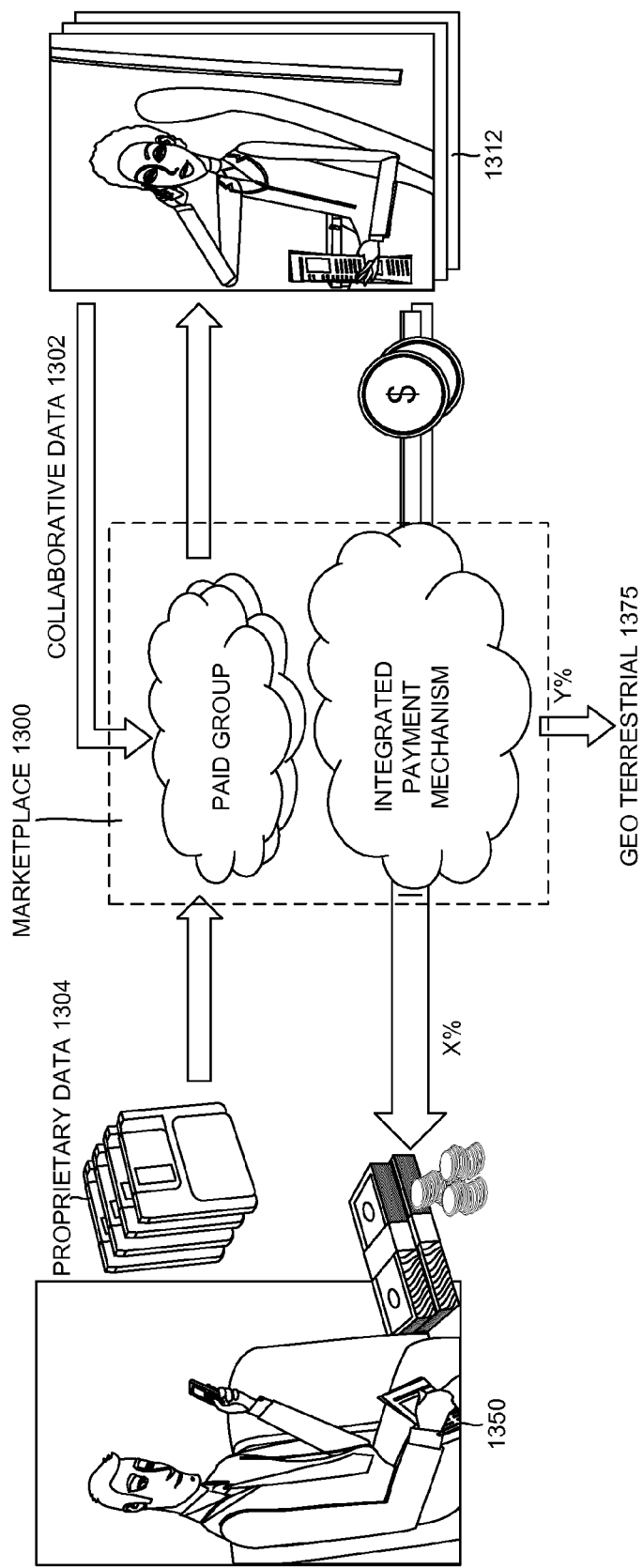
FIG. 13 illustrates an online member-contributed geo-spatial data marketplace for group content owners in a social community, according to one or more embodiments.

FIG. 13 illustrates an online member-contributed geo-spatial data marketplace 1300 for group content owners in a social community, according to one or more embodiments.

In one or more embodiments, the application also provides peer-peer marketplace for user generated or professional location-tagged data. In one or more embodiments, the application may provide access to an online marketplace 1300 of local mapping data, and the application store of static or dynamic local content.

In one or more embodiments, the online marketplace 1300 may offer access to data sets that may be updated in real-time without requiring additional transactions such as, for example weather alerts, earthquake alerts and so on, in contrast to more typical static data sets like restaurants, hotels, etc.

In one or more embodiments, when a user logs into the social community network, the user may be provided access to a repository that includes a large list of data sets. In one or more embodiments, each data set may be a group in the system. Furthermore, in one or more embodiments, each of the data set may be priced appropriately by provider of the data.

In one or more embodiments, information for the data set 1302 may have been collaboratively generated by other existing subscribers of the data set, or professionally uploaded by provider, or both.

In one or more embodiments, the professionally uploaded data set may be a proprietary data 1304 provided by the provider 1350. In one or more embodiments, the online marketplace 1300 may provide means to search a repository of data sets so that the users may be enabled to conveniently find the requirements.

In addition, the online marketplace 1300 may also provide means to preview select data sets before purchase. Furthermore, in one or more embodiments, the online marketplace 1300 may provide a plurality of payment models such as for example, a one-time payment, and monthly/yearly subscription.

In other words, each data set may be the content within a group, where upon payment the user is granted membership of the group. In one or more embodiments, upon membership, the user may be enabled to access to content within the group. The data within the group may have been collaboratively accumulated 1302 by member 1312 contributions, or it may have been solely uploaded by group-owner or provider, or any combination thereof.

The content within the group as described in the disclosure may not be limited to the list of map data points, but also includes the pictures, reviews, comments, ratings, etc. the users would have annotated upon existing data. In one or more embodiments, while the list of data points may or may not be static, the pictures, comments, reviews, etc. may be always dynamic and growing.

In one or more embodiments, the group owner at any point in time may be enabled to convert a free group to a paid group in the online marketplace 1300 to monetize on collaborative contributed content 1302 built up over time. In one or more embodiments, there may be no restriction on the amount of data required to constitute a data set for the marketplace. For example, the group owner could sell information about ten popular San Francisco nightclubs for $1 one time, and in the same marketplace the user may be provided access to live foreclosure listing updates on the map throughout the US for $10 per month.

In one or more embodiments, there may be an integrated payment mechanism to manage transactions in the online marketplace 1300. The users who access information upon payment may be the main source of revenue.

In one or more embodiments, profit generated may be distributed to the providers 1350 and the contributors based on various transaction models. In one or more embodiments, the users who contribute information may be provided a small payment. The information provider 1350 who may provide substantial proprietary data 1304 may be provided a percentage of profit (e.g., x %). Furthermore, the grouping services provider 1375 may be provided with a percentage of profit (e.g., y %).

Figure 14:
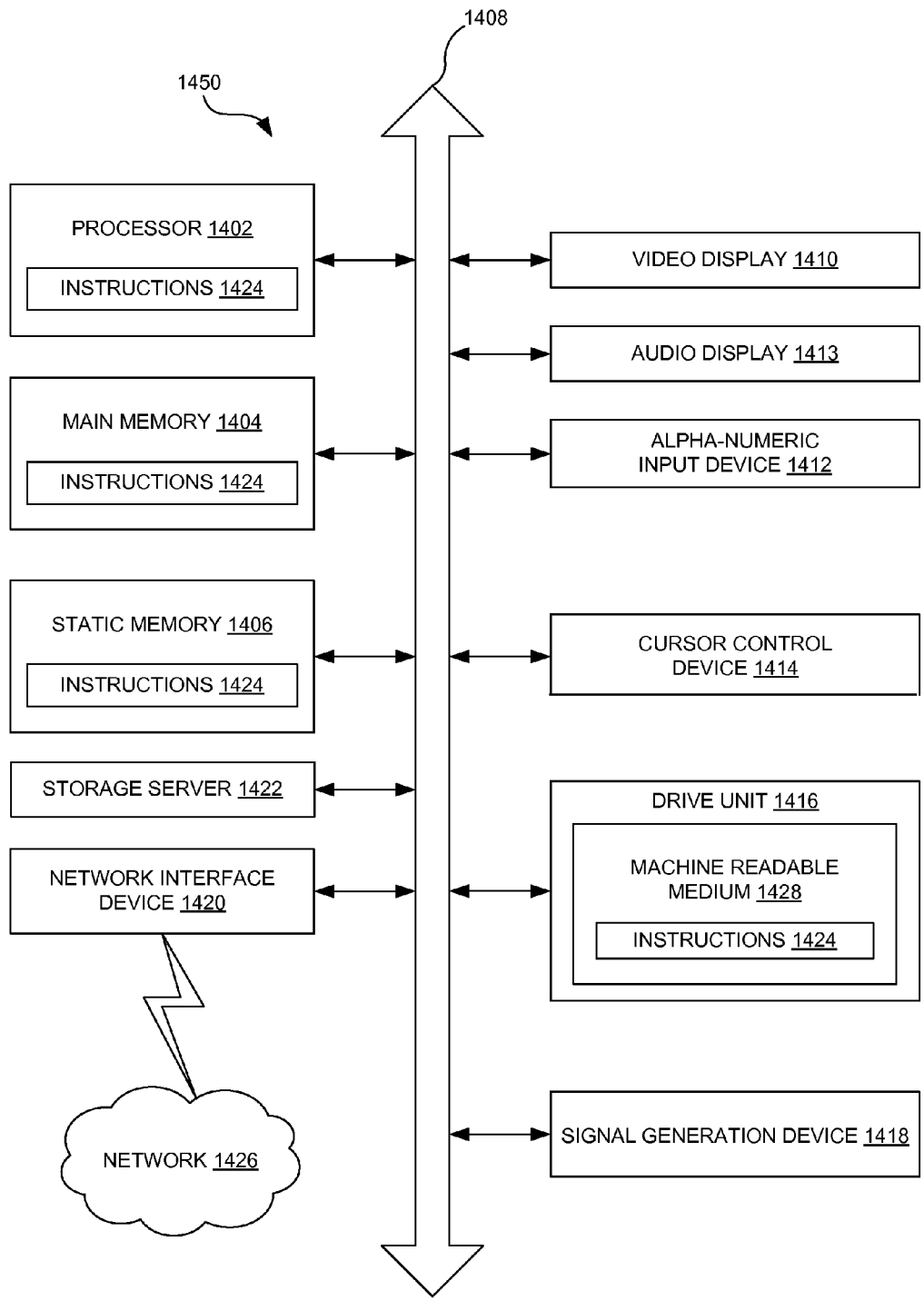
FIG. 14 is a diagrammatic system view of a data processing system in which any of the embodiments disclosed herein may be performed, according to one embodiment.

FIG. 14 is a diagrammatic system view of a data processing system in which any of the embodiments disclosed herein may be performed, according to one embodiment.

Particularly, the diagrammatic system view 1400 of FIG. 14 illustrates a processor 1402, a main memory 1404, a static memory 1406, a bus 1408, a video display 1410, an alphanumeric input device 1412, a cursor control device 1414, a drive unit 1416, a signal generation device 1418, a network interface device 1420, a storage server 1422, instructions 1424, and a network 1426, a machine readable medium 1428 according to one embodiment.

The diagrammatic system view 1400 may indicate a personal computer and/or the data processing system in which one or more operations disclosed herein are performed. The processor 1402 may be a microprocessor, a state machine, an application specific integrated circuit, a field programmable gate array, etc.

The main memory 1404 may be a dynamic random access memory and/or a primary memory of a computer system. The static memory 1406 may be a hard drive, a flash drive, and/or other memory information associated with the data processing system. The bus 1408 may be an interconnection between various circuits and/or structures of the data processing system.

The video display 1410 may provide graphical representation of information on the data processing system. The alphanumeric input device 1412 may be a keypad, a keyboard and/or any other input device of text (e.g., a special device to aid the physically handicapped).

The cursor control device 1414 may be a pointing device such as a mouse. The drive unit 1416 may be the hard drive, a storage system, and/or other longer term storage subsystem. The signal generation device 1418 may be a bios and/or a functional operating system of the data processing system.

The network interface device 1420 may be a device that performs interface functions such as code conversion, protocol conversion and/or buffering required for communication to and from the network 1426. The storage server 1422 may be a local server or a remote server including a database to save data associated with one or more groups created based on geospatial information associated with one or more users.

The machine readable medium 1428 may provide instructions on which any of the methods disclosed herein may be performed. The instructions 1424 may provide source code and/or data code to the processor 1402 to enable any one or more operations disclosed herein.

Figure 15:
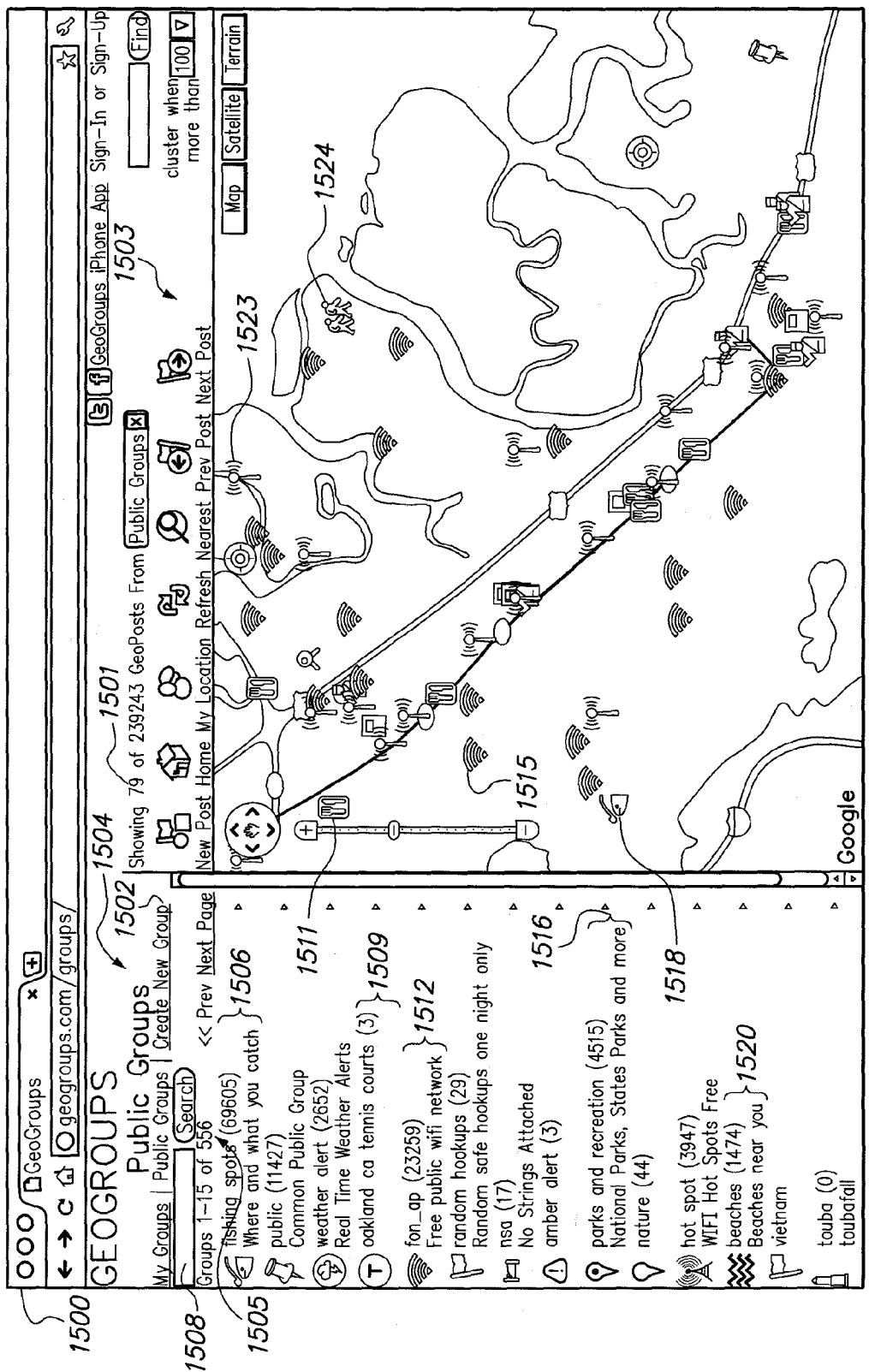
FIG. 15 is a screenshot of a "public group" display served up by a server according to an exemplary embodiment of the present invention.

FIG. 15 is a screenshot of the "public group" display 1500 served up by a server according to an exemplary embodiment of the present invention.

"Public group" screenshot 1500 comprises two main areas, namely map area 1503 and list area 1504. As can be seen, list area 1504 displays public geosocial groups previously created by users such as group creator 104 of FIG. 1. Any one or more of the displayed geosocial groups can be joined by prospective or existing users.

Among other public groups, geosocial public groups of list area 1504 include fishing spots 1506, oakland ca tennis courts 1509, fon_ap 1512, parks and recreation 1516 and beaches 1520. In fact, as indicated by counter 1505, there are currently 556 geosocial public groups in operation consistent with the spirit and scope of the present invention.

Unlike many prior art social networking services, users can create social groups based on their interests. Users are not restricted to any particular interest or topics as commonly found in conventional social networking services. Not only can users create groups according to their interests, users can join preexisting groups across different topic boundaries.

Alongside list area 1504, map area 1503 displays a vicinity map showing posts or geoposts by the public group users of contextual or location information related for to topics of interest for each the associated geosocial group, As an example, fishing location 1518 is a location post by a member of public group fishing spots 1506. That fishing location is shown as a map data point at Water Dog Lake Park. Fishing location 1518 is easily identifiable by a fishing icon that also represents the public group fishing spots 1506. In this manner, members of fishing spots 1506 can quickly discover fishing locations proximate to their location by viewing the map.

As another example, WiFi location 1515 is posted by a member of public group fon_ap 1512. This WiFi location is shown as a map data point at Sugar Loaf. WiFi location 1515 can quickly be identified by a radio wave icon that also represents the public group fon_ap 1512. Consequently, fon_ap 1512 members need only examine the map to discover free WiFi locations proximate to users' locations.

Although not reflected on list area 1504, geosocial public groups and corresponding posts (geoposts) within the geographical boundary of the map area (Belmont, Calif.) displayed, are shown on the map as icons representing the associated public group. For example, restaurant location 1513 is a geopost for a public restaurant group, hiking location 1524 represents a post from a public hiking group member and various WiFi locations 1523 are from members of a public WiFi group not displayed in list area 1504. In fact, there are a total of 79 such posts on the map as indicated by counter 1501.

Group creator 104 wishing to create a geosocial group for a topic of interest begins by using search box 1508 for conducting a search for pre-existing groups that might possibly cover the same topic. If the search is negative, group creator 104 can then select "create new group" link 1502. Upon selecting link 1502, "create new group" browser 1600 is served up as illustrated with reference to FIG. 16 below.

Figure 16:
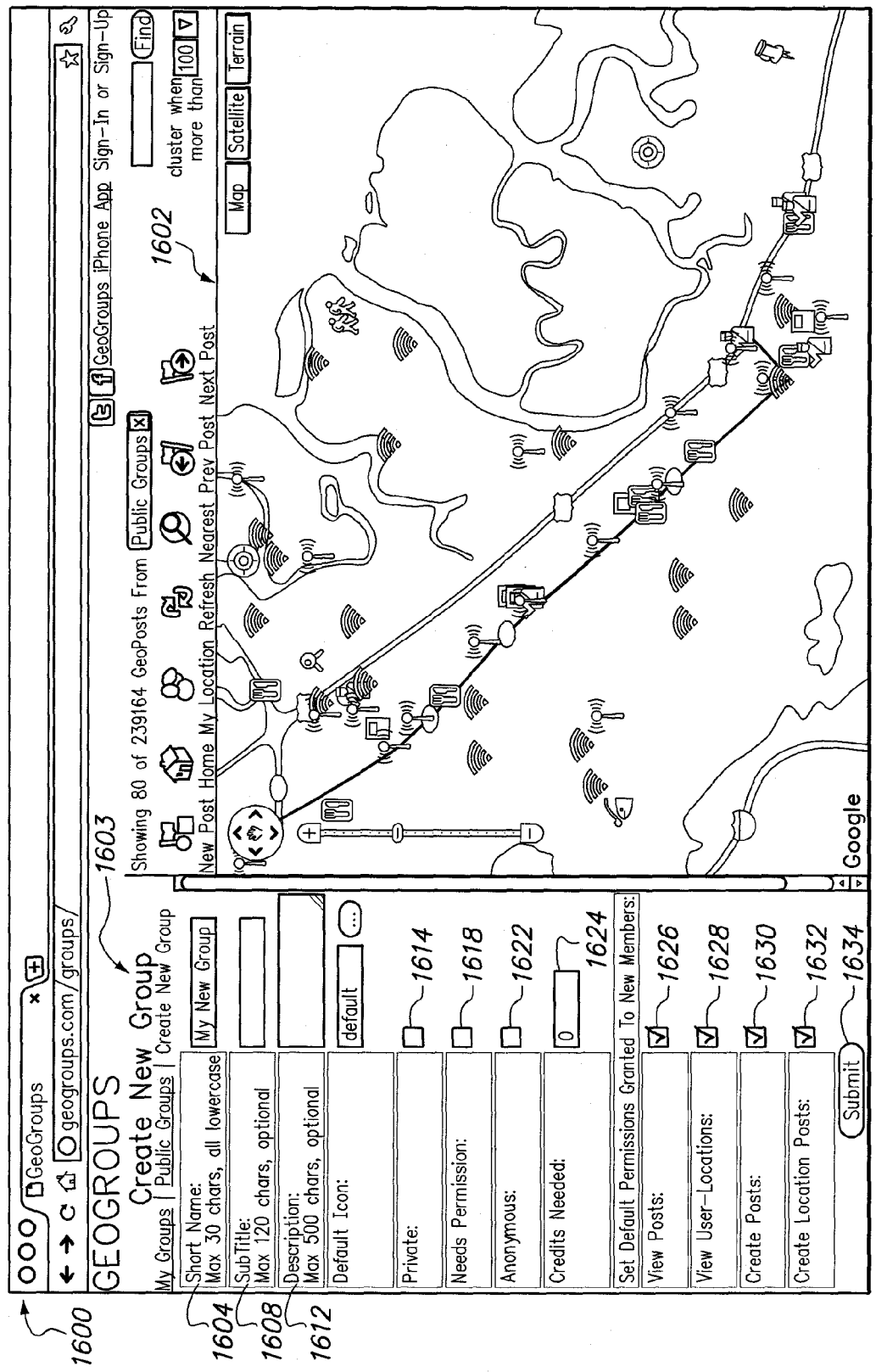
FIG. 16 is a screenshot of a "create new group" display in accordance with an exemplary embodiment of the present invention.

FIG. 16 is a screenshot of "create new group" display 1600 in accordance with an exemplary embodiment of the present invention.

In FIG. 16, "create new group" display 1600 is employed for creating new groups for user-specified topics of interest. As noted, this "create new group" display 1600 is generated upon selecting "create new group" link 1502 of FIG. 15.

In FIG. 16, "create new group" screenshot 1600 also includes a map area 1602 and form area 1603. Form area 1603 functions to receive requisite data for creating the new group. Thus, form area 1603 includes data fields for receiving information and captions for the associated data fields. These data fields are short name 1604 in which the name of the new group is entered, an optional subtitle 1608 data field, and description 1612 data field for entering a description of the new group.

In FIG. 16, group creator 104 has entered "My New Group" in short name 1604 data field so that the new group is named My New Group. Subtitle 1608 and description 1612 have been left blank.

Form area 1603 also includes a plurality of check boxes namely private check box 1614 used by group creator 104 to indicate whether My New Group remains private and does not appear in the public group listings. Permission check box 1618 is used to determine whether users, namely prospective user 120 and verified user 130 (FIG. 1) need permission from group creator 104 to join this group. Anonymous check box 1622 is used to create anonymity. Since check box 1622 is left unchecked, the identity of group creator 104 remains undisclosed.

Form area 1603 also comprises credits needed 624 data field that is particularly advantageous for the present invention. Credits needed 624 can be used to indicate whether data for My New Group is paid content. Specifically, if group creator 104 provides paid content such as foreclosure listings, prospective and verified users are required to pay for viewing such content. This is an advantage of the present invention unknown to prior art systems. Here, zero "0" credit is entered, thus, all content for My New Group remains unpaid content.

Form area 1603 also includes other check boxes for granting default permissions to new members. Check box 1626 is used to determine whether members can view posts within My New Group; check box 1628 is for determining whether members can view user locations with My New Group; check box 1630 is used to determine whether members can create posts within My New Group; such posts or geoposts include contextual data and map data as previously referenced with reference to the preceding drawings; check box 1632 is for determining whether members can create location posts within My New Group. Since group creator 104 has checked all of check boxes 1626, 1628, 1630 and 1632, default permissions associated with the check boxes are granted to members.

Upon entering all of the requisite information, group creator 104 simply selects submit button 1634 to create My New Group. In this manner, the present invention enables all users to create any and all groups related to their topics of interest. Users are not hamstrung by topics constrained upon them by typical conventional social networking services.

Figure 17:
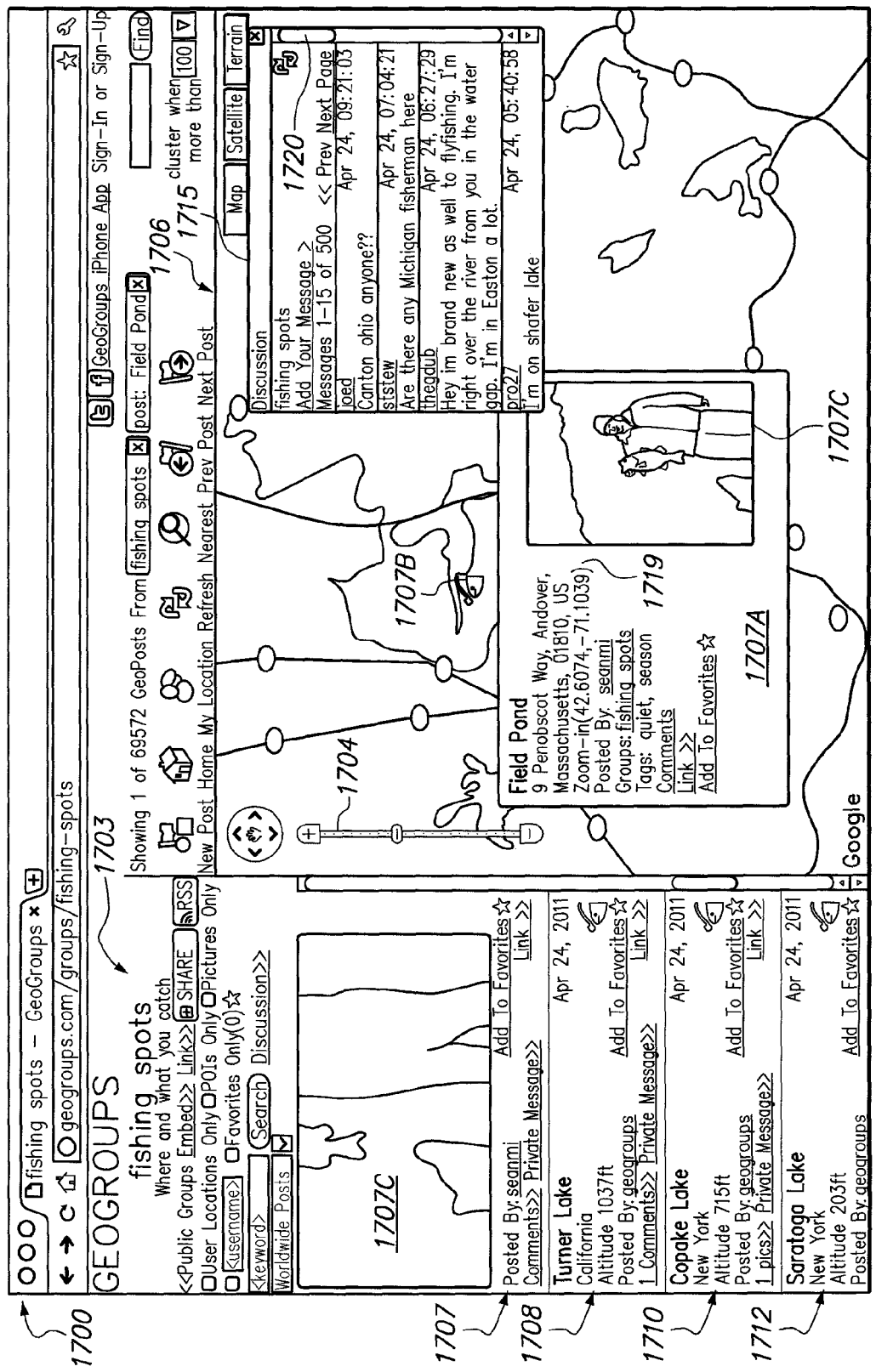
FIG. 17 illustrates a "fishing spot" screenshot in accordance with an exemplary embodiment of the present invention.

FIG. 17 illustrates "fishing spot" screenshot 1700 in accordance with an exemplary embodiment of the present invention.

In FIG. 17, this "fishing spot" view is displayed to members of the group "fishing spots" 1506 (FIG. 15). As shown, "fishing spot" screenshot 1700 includes list area 1703 and map area 1706.

List area 1703 includes member posts 1707, 1708, 1710, and 1712. All of the member geoposts primarily include locations of fishing spots and other contextual information. As shown, member post 1707 includes an image 1707C of the member displaying a fish caught by the member and also includes the location of a fishing spot as further discussed below.

Member post 1708 posted by geogroups is the Turner Lake, Calif. fishing location. Another fishing location namely Copake Lake, N.Y. is included in member post 1710. Member post 1712 includes a further fishing location namely Chautauqua Lake, N.Y.

Each of these member geoposts is then shown on the corresponding map area 1707 to the extent that the fishing locations are within the map vicinity. Note that map 1706 can be zoomed out using bar 1704, in which case additional geoposts are shown indicated on the map as data points.

In particular, map area 1706 shows pop-up 1707A displayed when a user manipulates an input device over fish icon 1707B, which corresponds to the map data point for member post 1707.

Pop-up 1707A shows that the fishing location posted by the member is Field Pond, Mass. The geospatial coordinates to which the geopost is placed is 42.6074, −71.103 4. The member name is seanmj and the group is fishing spots.

Pop-up 1707A also shows uploaded image 1707c, which in turn, is automatically associated with the geospatial coordinates 42.6074, −71.103. Note that the field pond address is automatically captured as well.

Map area 1706 also includes discussion area 1715, wherein real time discussions relating to fishing are held. Members can manipulate scroll bar 1720 to view more or less discussion as desired.

Figure 18:
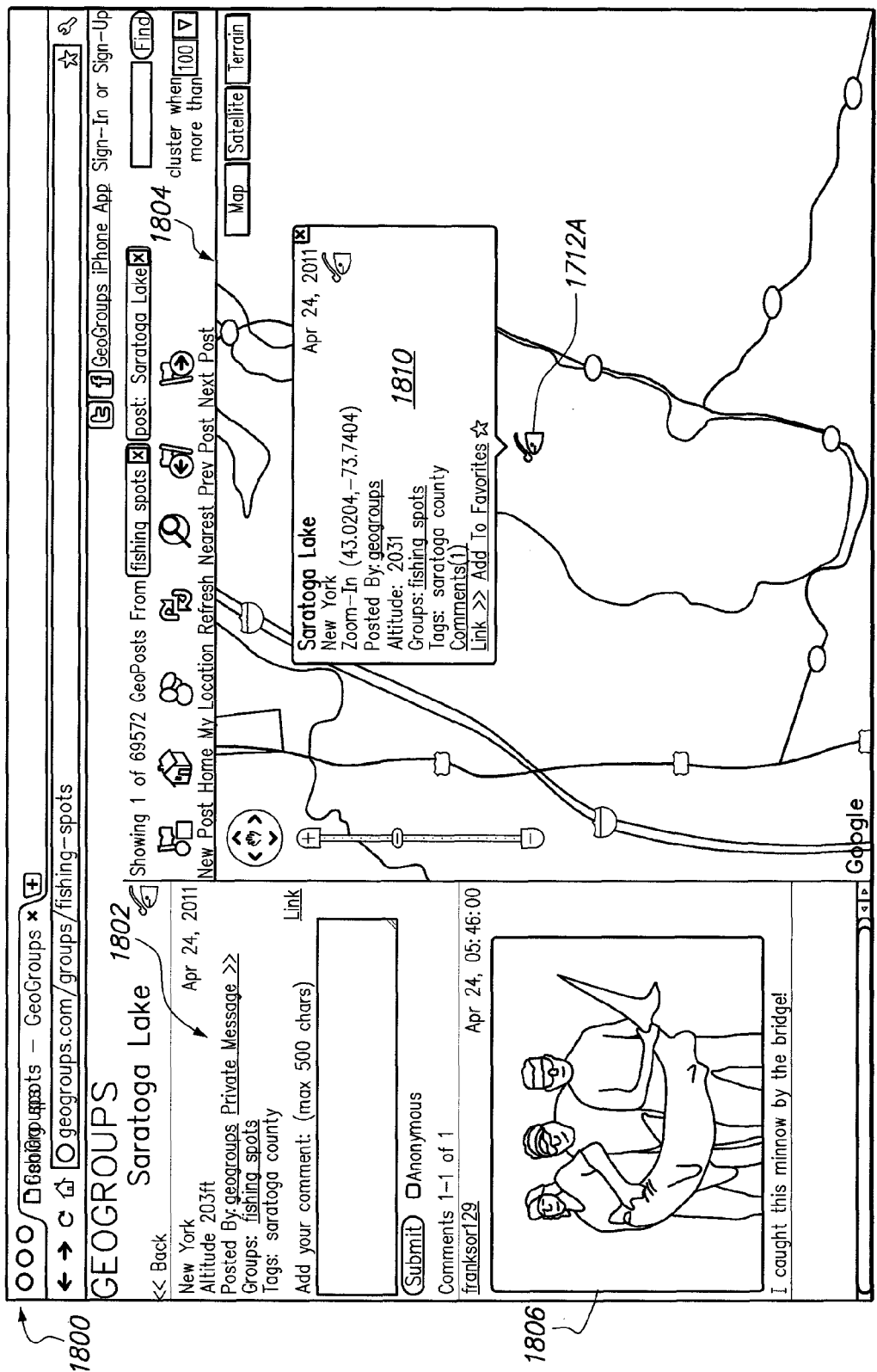
FIG. 18 shows a "saratoga lake" screenshot according to an exemplary embodiment of the present invention.

FIG. 18 shows "saratoga lake" screenshot 1800 according to an exemplary embodiment of the present invention.

"Saratoga lake" screenshot 1800 shows the view displayed when member post 1712 of FIG. 17 is selected. As in the previous embodiments, screenshot 1800 includes map area 104 and detail area 1802. As can be seen, another advantage of the present invention is that detailed information for each geopost can be obtained by drilling down and selecting specific links.

Here, detail area 1802 shows additional contextual information relating to member post 1712. Specifically, the member fanksor129 has uploaded image 1806 of minnow fish that was caught at the Saratoga Lake fishing spot. Member fanksor129 has also commented that the fish was caught by the bridge.

Map area 1804 shows pop-up 1810 displayed when a user manipulates an input device over fish icon 1712A, which corresponds to the map data point for member post 1712 (FIG. 17). Pop-up 1810 shows that the fishing location posted by the member is Saratoga Lake, N.Y. The map geospatial coordinates for the geopost is 43.0204, −73.704.

Figure 19:
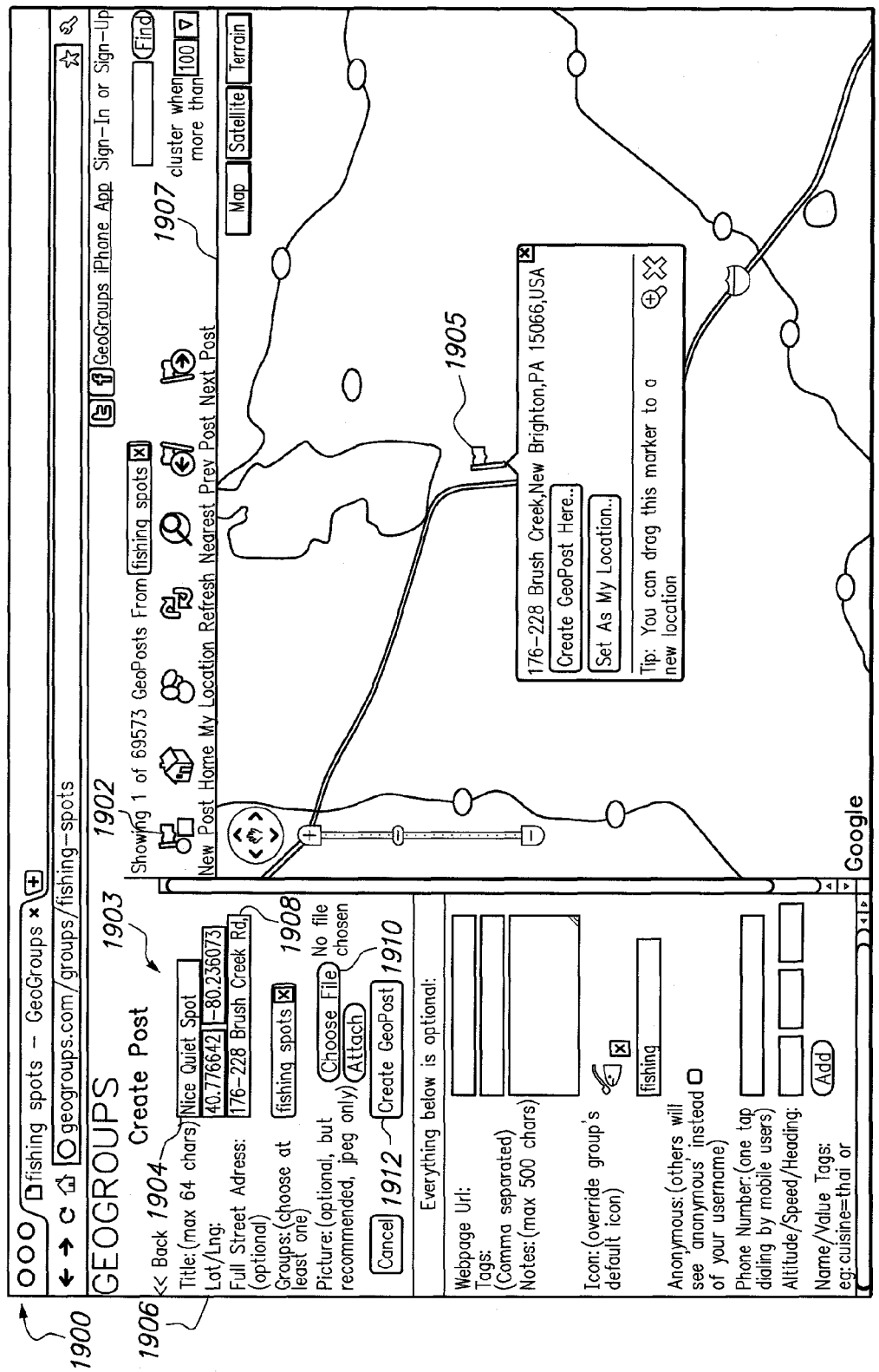
FIG. 19 illustrates a "create post" screenshot in accordance with an exemplary embodiment of the present invention.

FIG. 19 illustrates "create post" screenshot 1900 for creating a geopost for uploading data to a server in accordance with an exemplary embodiment of the present invention.

In FIG. 19, a user wishes to create a geopost indicating that a certain location is a nice, quiet spot for fishing. The user begins by selecting "new post" button 1902 and thereupon marker 1905 is placed on the map 1907. "Create geopost here" 1907 button and "set as my location" 1909 button that are associated with marker 1905 are also displayed.

If the location of marker 1905 is not the desired location, the user can drag the marker to a new location. Once satisfied with the location, the user selects "create geopost here" 1907 button whereupon "create post" 1903 form is generated.

The user can then provide a title 1904 while the latitude/longitude 1906 is automatically populated; address 1908 is automatically populated as well. Thus, another advantage of the present invention is that the geospatial coordinates are automatically associated with the input data provided with the user.

In FIG. 19 as shown, the title 1904 is Nice Quiet Spot. The user can also choose to upload a file by selecting the "choose file" button 1910 to choose and upload a file. Once all of the information is completed, the user selects button 1912 to create the geopost. The geopost and any and all map data are then associated with data point 40.776642, −89.236073 on the map.

The user can also click or select "set as my location" 1909 button to set the marker 1905 location as the user's location. In one embodiment, this location is then used to provide alerts (geoalerts) and advertisements to the user as relevant to the user's location. In this manner, users can post data to any geosocial group to which the user is permitted to contribute data.

Figure 20:
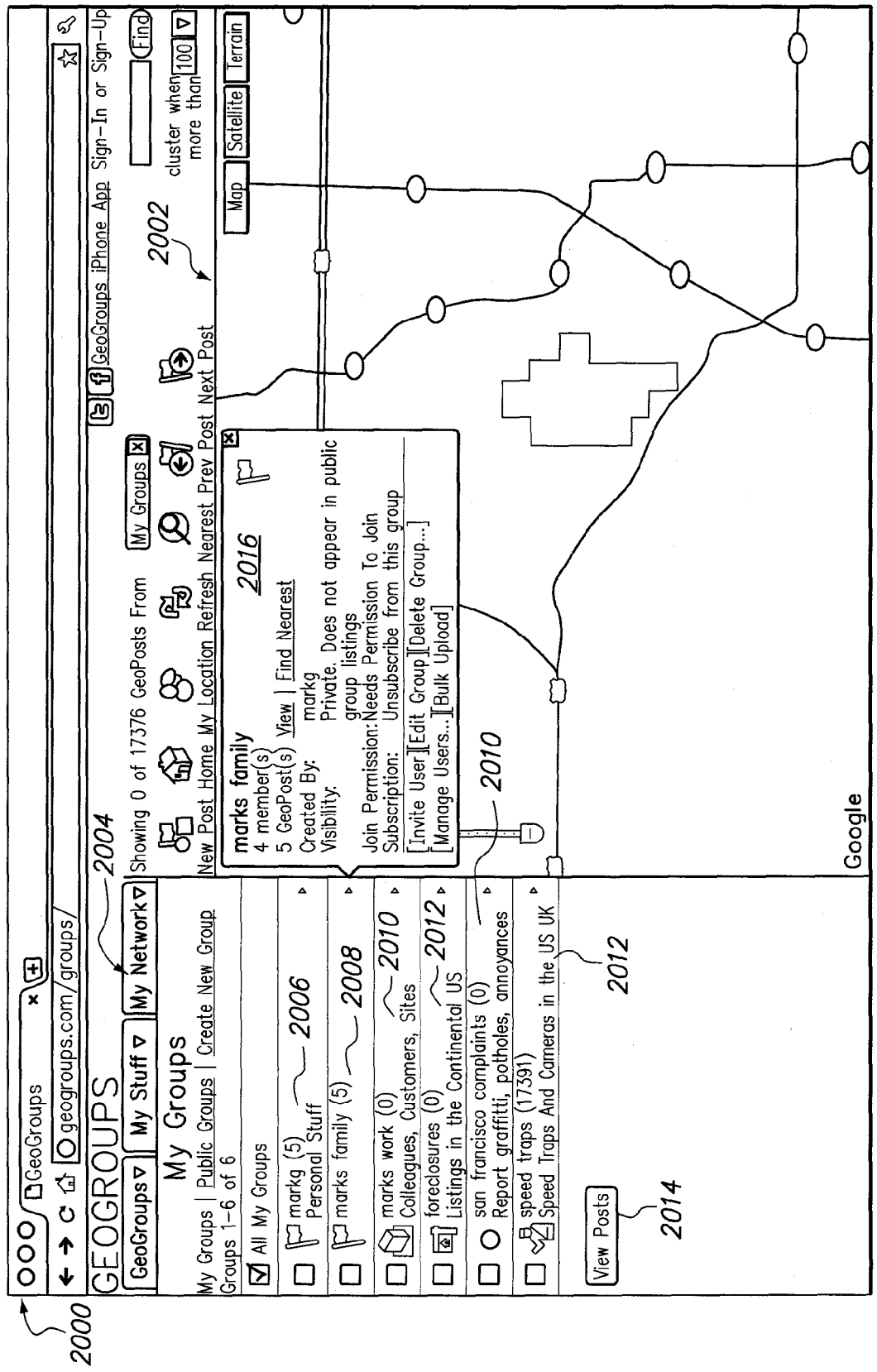
FIG. 20 shows a "my groups" screenshot 2000 according to an exemplary embodiment of the present invention.

FIG. 20 shows "my groups" screenshot 2000 according to an exemplary embodiment of the present invention.

In FIG. 20, "my groups" screenshot 200 shows all of the geosocial groups to which user markg belongs. The geosocial groups shown in list area 2004 are markg 2006, marks family 2008, marks work 2010, foreclosures 2012, san francisco complaints 2010 and speed traps 2012.

A view posts 2014 button can also be selected to view posts related to markg's geosocial groups. As previously discussed, users of the present invention can create and become members of multiple geosocial groups. In this example, user markg is a member of at least 6 geosocial groups.

Upon manipulating an input device over marks family 2008, pop-up 2016 is displayed. Pop-up 2016 shows that marks family 2008 is a private geosocial group. Thus, its listing does not appear in the public group list area 1504 of FIG. 15. As shown, permission is needed to join marks family 2008. "My groups" screenshot 2000 also includes map 2002 for displaying geoposts for all of markg's geosocial groups.

Figure 21:
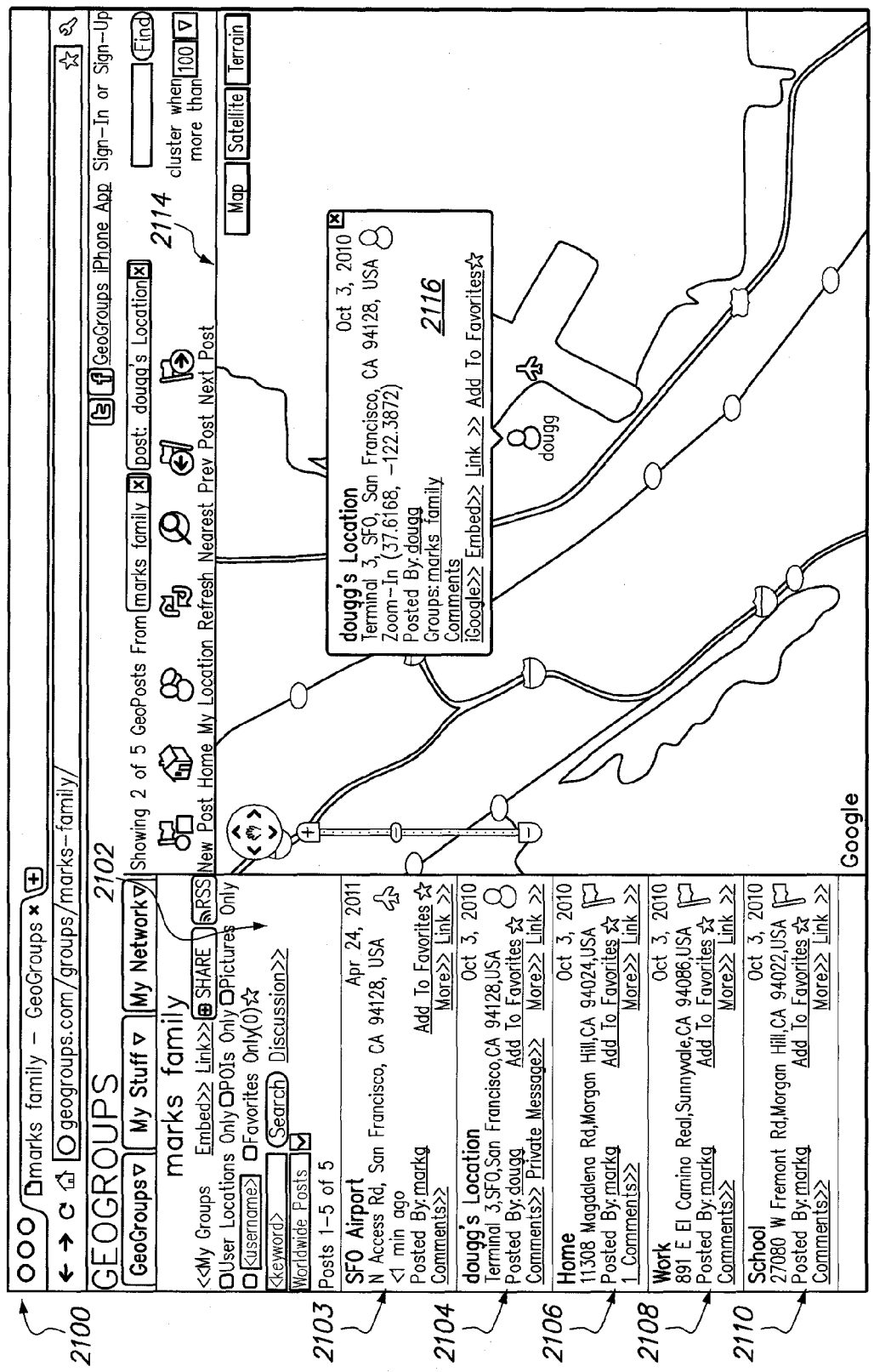
FIG. 21 illustrates a "marks family" screenshot according to an exemplary embodiment of the present invention.

FIG. 21 illustrates "marks family" screenshot 2100 according to an exemplary embodiment of the present invention.

Specifically, the interface captured by "marks family" screenshot 2100 is displayed when a user selects marks family 2008 of FIG. 20. Here, marks family 2008 is a family geogroup for tracking the location of the family members.

In FIG. 21, list area 2102 shows destinations frequented by marks family 2008 members. Destinations include SFO Airport 2103, dougg's location 2104, Home 2106, Work 2108 and School 2110. These destinations are posted as geoposts within marks family 2008. The posts are also data points on map 2114.

In one embodiment, each family member carries a GPS enabled device by which family member locations are tracked. As an example, pop-up 2116 indicates the location of dougg, a member of markg's family. Pop-up 2116 shows that dougg is at Terminal 3 of SFO airport. In this manner, family members become aware of locations of their loved ones. Note that each user has the option to turn tracking off.

Figure 22:
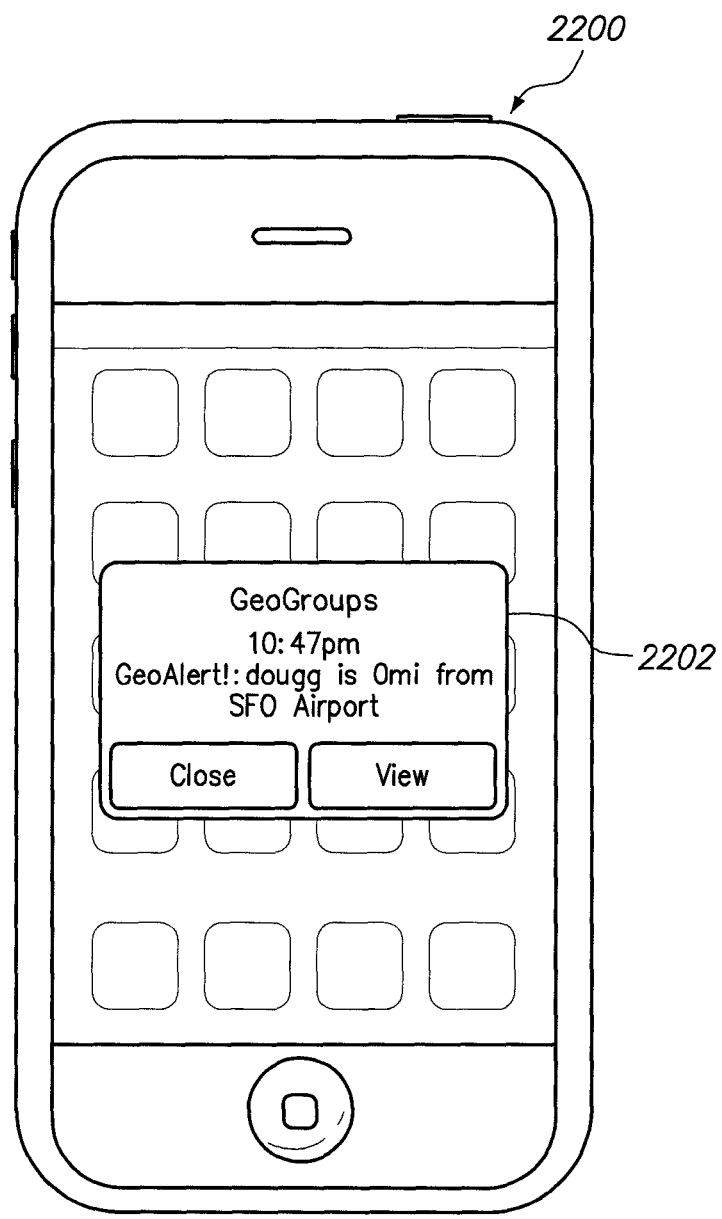
FIG. 22 is a screen shot of a mobile device according to an exemplary embodiment of the present invention.

FIG. 22 illustrates mobile device screenshot 2200 in accordance with an exemplary embodiment of the present invention.

In FIG. 22, mobile device screenshot 2200 shows geoalert 2202 sent to a family member indicating that dougg has arrived at SFO Airport. With the tracking system of the present invention, geogroup members can also send alerts to each other. Distance preferences can be set such that when a user is within a predetermined distance from a location of interest such as SFO Airport 2103, an alert notification is sent to family members. Similarly, when a user is within a predetermined distance from another user; an alert notification is also sent to users.

While the above is a complete description of exemplary specific embodiments of the invention, additional embodiments are also possible. Thus, the above description should not be taken as limiting the scope of the invention, which is defined by the appended claims along with their full scope of equivalents.

I claim:

1. A map-based method for geosocial networking that aggregates a plurality of users around locations of interest, said method being computer-implemented and said map-based method comprising:

generating at least one map configured to receive a plurality of locations with identical activities or items of interest;

generating for each and every user at the user's option, a plurality of geosocial groups, each geosocial group based on the locations with identical activities or items of interest specified by the user, wherein for a geosocial group, the at least one map receives from the geosocial group creator, map-based data for at least one location that has an activity or item of interest, wherein said at least one location is identified on the map by user selection of said location on the at least one map, wherein the at least one map also receives map data from a plurality of members of the geosocial group or the geosocial group creator, map-based data for additional locations having activities identical to the at least one location provided by the geosocial group creator;

aggregating all of the plurality of locations on the map for viewing by members of the geosocial group; and defining permissions granted to new members of each geosocial group, said permissions indicating whether new members can provide and view said data on a map.

2. The method of claim 1 further comprising
automatically associating geospatial coordinates upon said user selection of said location on the at least one map.

3. The method of claim 2 wherein said geospatial coordinates are variable by dragging a marker on the map.

4. The method of claim 1 wherein the data is user location data received from a user.

5. The method of claim 1 wherein data received from users are viewable as posts at location data points on a map depending on a zoom level of a geographic span of the map on a viewing device.

6. The method of claim 5 wherein the posts are listed contemporaneously alongside the map having the location data points.

7. The method of claim 1 wherein said data is an advertisement received from an advertiser for posting to a geosocial group.

8. The method of claim 7 wherein the advertisement is based on the locations with identical activities or items of interest of a geosocial group.

9. The method of claim 7 wherein the advertisement is based on a pattern of repeated travel of a target user.

10. The method of claim 7 wherein the advertisement is dynamically placed on a map based on proximity of a targeted user to a location of interest.

11. The method of claim 7 wherein the advertisement is based on a zoom level of a geographic span of the map on a viewing device.

12. The method of claim 7 wherein the advertisement is based on a threshold number of advertisements for a zoom level of a geographic span of a map on a viewing device.

13. The method of claim 1 wherein the data is designated as paid content received from a creator of a geosocial group by specifying an amount of credit needed by members of the geosocial group to view said paid content.

14. The method of claim 1 further comprising
determining when a user is within a predetermined distance from a location of interest; and sending an alert notification to the user.

15. The method of claim 1 further comprising
determining when a user is within a predetermined distance from another user; and sending an alert notification to the users.

16. The method of claim 1 further comprising generating a dedicated mobile phone application for use by each geosocial group.

* * * * *